United States Patent [19]
Holenka et al.

[11] Patent Number: 5,513,528
[45] Date of Patent: May 7, 1996

[54] LOGGING WHILE DRILLING METHOD AND APPARATUS FOR MEASURING STANDOFF AS A FUNCTION OF ANGULAR POSITION WITHIN A BOREHOLE

[75] Inventors: Jacques M. Holenka; Michael L. Evans, both of Missouri City; Philip L. Kurkoski, Houston; William R. Sloan, Missouri City; David L. Best, Houston, all of Tex.

[73] Assignee: Schlumberger Technology Corporation, Sugar Land, Tex.

[21] Appl. No.: 407,725

[22] Filed: Mar. 20, 1995

Related U.S. Application Data

[62] Division of Ser. No. 183,089, Jan. 14, 1994, Pat. No. 5,473,158.

[51] Int. Cl.$^6$ .............................. G01V 1/00; E21B 47/08
[52] U.S. Cl. .............................. 73/151; 304/422; 181/105; 307/35
[58] Field of Search .................... 73/151, 152; 367/35, 367/86, 99; 181/105; 175/40, 45; 364/422

[56] References Cited

U.S. PATENT DOCUMENTS

| | | | |
|---|---|---|---|
| 5,017,778 | 5/1991 | Wraight | 250/254 |
| 5,091,644 | 2/1992 | Minette | 250/254 |
| 5,130,950 | 7/1992 | Orban et al. | 367/34 |
| 5,134,285 | 7/1992 | Perry et al. | 250/269 |
| 5,159,577 | 10/1992 | Twist | 367/25 |
| 5,163,521 | 11/1992 | Pustanyk et al. | 175/40 |
| 5,175,429 | 12/1992 | Hall, Jr. et al. | 250/262 |
| 5,237,540 | 8/1993 | Malone | 367/81 |
| 5,250,806 | 10/1993 | Rhein-Knudsen et al. | 250/254 |
| 5,397,893 | 3/1995 | Minette | 250/254 |

OTHER PUBLICATIONS

SPWLA 31st Annual Logging Symposium, Jun. 24–27, 1990. An Innovative Approach to Correct Density Measurements While Drilling for Hole Size Effect. by Best. D.: Wraight. P.; and Holenka J.

*Primary Examiner*—Hezron E. Williams
*Assistant Examiner*—Michael J. Brock
*Attorney, Agent, or Firm*—Gary L. Bush; Wayne I. Kanak

[57] ABSTRACT

A method and apparatus for measuring formation characteristics as a function of angular distance segments about the borehole is disclosed. The measurement apparatus includes a logging while drilling tool which turns in the borehole while drilling. Such characteristics as bulk density, photoelectric effect (PEF), neutron porosity and ultrasonic standoff are all measured as a function of such angular distance segments where one of such segments is defined to include that portion of a "down" or earth's gravity vector which is in a radial cross sectional plane of the tool. The measurement is accomplished with either a generally cylindrical tool which generally touches a down or bottom portion of the borehole while the tool rotates in an inclined borehole or with a tool centered by stabilizer blades in the borehole.

9 Claims, 24 Drawing Sheets

FIG. 2
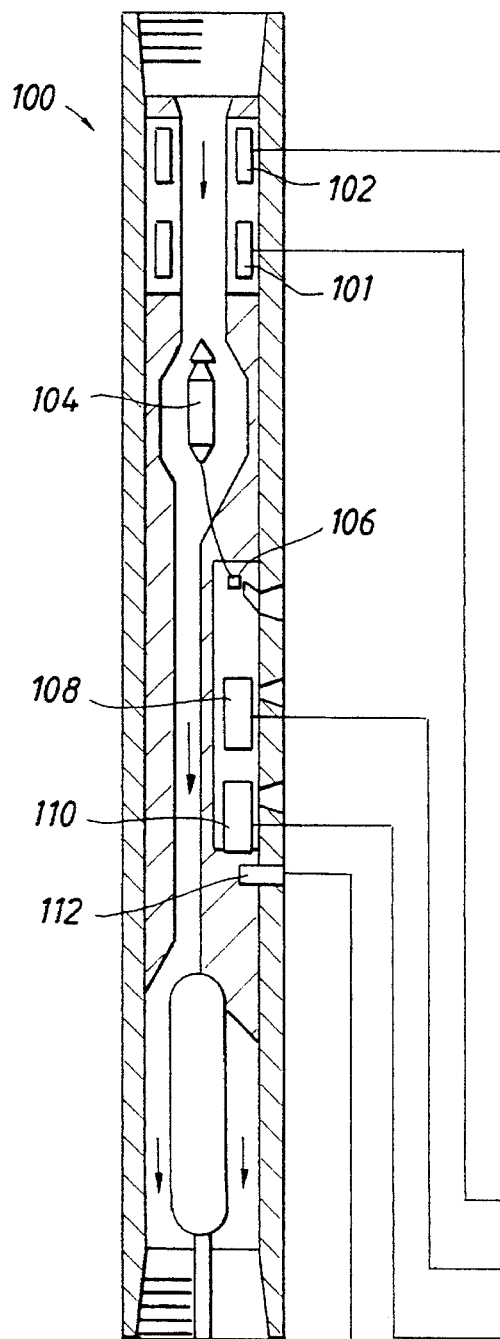
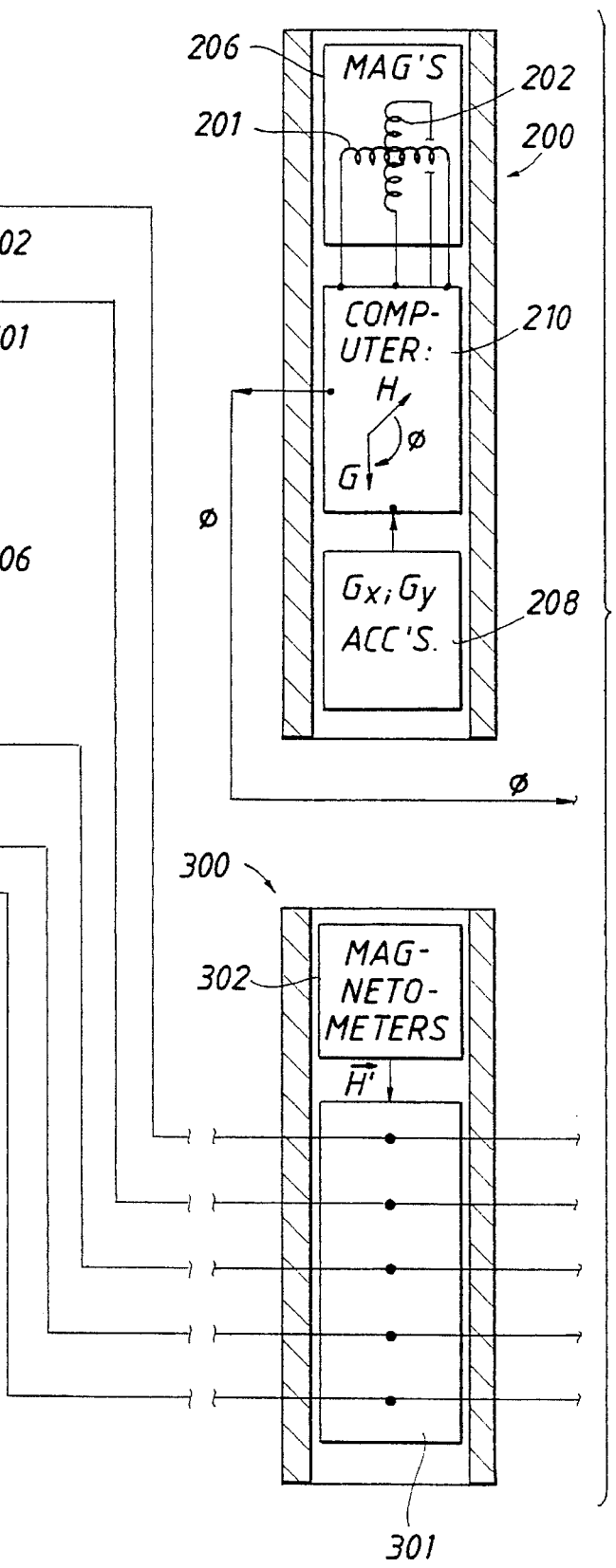
FIG. 3A

FIG.12F

FROM FIG.12E

FROM FIG.8 → SOFT WINDOW COUNT RATE SAMPLES IN $Q_{LEFT\ LNG.\ OR\ SHT.}$
HARD WINDOW COUNT RATE SAMPLES IN $Q_{LEFT\ LNG.\ OR\ SHT.}$
ACQUISITION TIME SAMPLES

335

- DETERMINE MACROSCOPIC CROSS-SECTION $U_{LEFT}$'s AS A FUNCTION OF ACQUISITION TIME $$U_{tLEFT} = \left[ \frac{K}{\left( \frac{SOFT\ COUNT\ RATE}{HARD\ COUNT\ RATE} \right) - B} \right] - C$$

- DETERMINE STANDARD DEVIATION FROM $U_{tLEFT}$'s
- DETERMINE $PEF_{ROT\ LEFT}$ FROM DISTRIBUTION OF $U_{tLEFT}$'s

→ $PEF_{ROT\ LEFT}$

COMPUTER PROGRAM FOR ULTRASONIC STANDOFF OUTPUTS

FROM FIG.4A-B

- RECORD STANDOFF AS A FUNCTION OF QUADRANT
- DEVELOP HISTOGRAM OF ALL STANDOFFS AND HISTOGRAM OF STANDOFFS PER QUADRANT
- DETERMINE $STANDOFF_{AVG}$, $STANDOFF_{MAX}$, $STANDOFF_{MIN}$ FOR EACH QUADRANT
- DETERMINE HOLE SHAPE:
    HORIZONTAL DIAMETER → H DIAMETER
    VERTICAL DIAMETER → V DIAMETER

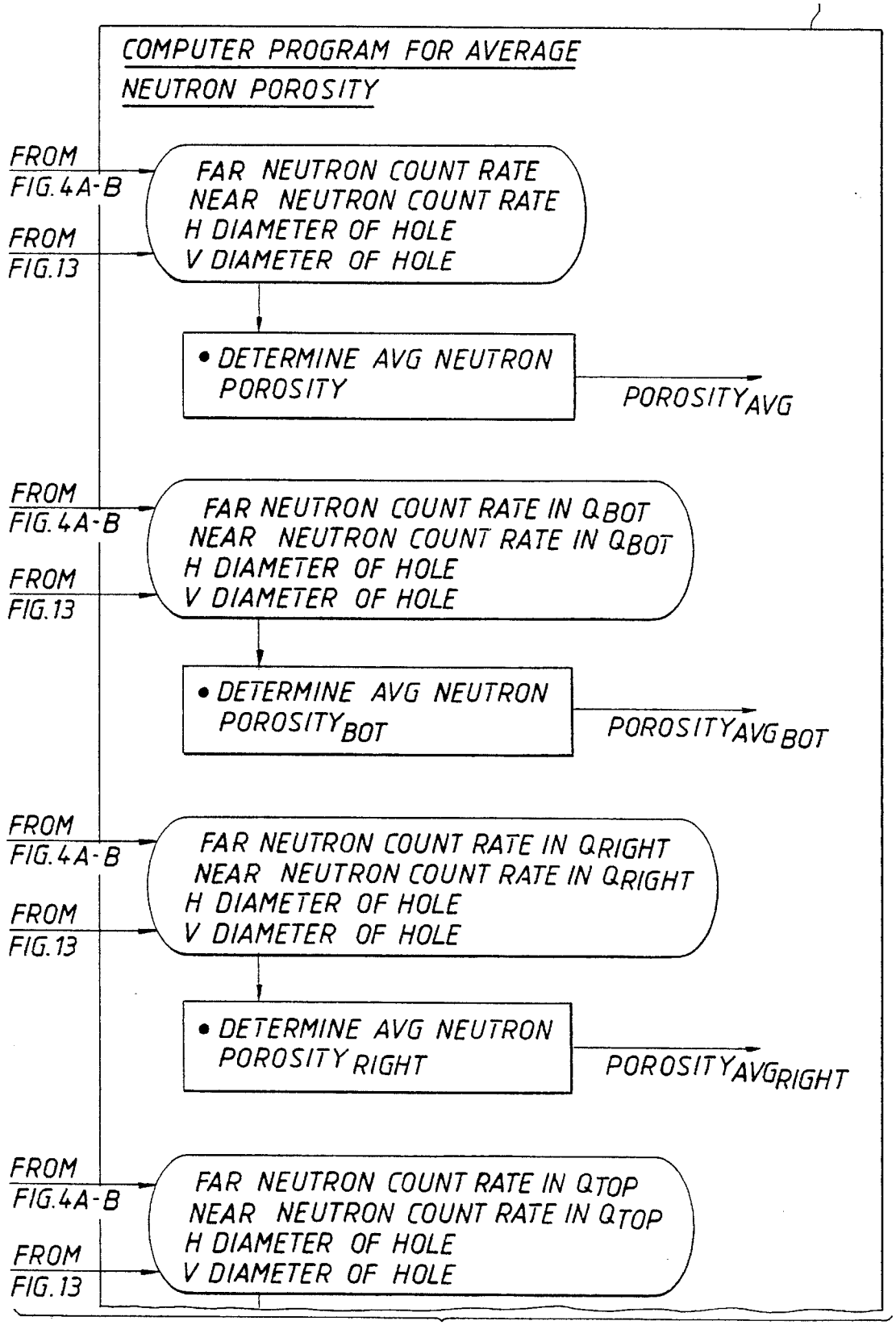

LOGGING WHILE DRILLING METHOD AND APPARATUS FOR MEASURING STANDOFF AS A FUNCTION OF ANGULAR POSITION WITHIN A BOREHOLE

This is a division, of application Ser. No. 08/183,089, filed Jan. 14, 1994 U.S. Pat. No. 5,473,158.

BACKGROUND OF THE INVENTION

1. Field of the Invention

This invention relates generally to the field of logging while drilling tools. In particular it relates to such tools for measurement of formation characteristics such as bulk density, photoelectric effect (PEF), neutron porosity and borehole caliper by means of ultrasonic measurements. Still more particularly, the invention relates to apparatus and methods for making such measurements as a function of angular position about the borehole as the tool is turning in such borehole during drilling.

2. Description of the Related Art

U.S. Pat. No. 5,091,644 of Minette describes a method for analyzing formation data with a logging while drilling tool. Such patent describes dividing the cross section of the borehole into two or more sectors. Gamma ray density signals are divided into four quadrants: top, bottom, right and left for operations in deviated boreholes. The gamma ray signals are collected as to their energy level so as to produce energy spectra for each quadrant. The '644 patent indicates that long and short spaced detectors are used to collect gamma ray count rate data to produce compensated density measurements.

Each quadrant measurement is combined with the other, either as a simple average or as a weighted average to produce a density value characteristic of the formation. If the borehole has minimal washout, all four compensated density measurements are used. If there is extensive washout, the "bottom and the two side measurements" are used to calculate density of the formation. If the borehole suffers extreme washout, only the "bottom" measurement is used.

The '644 patent describes error minimization whereby the spine and ribs correction is obtained for long and short spaced detector gamma ray spectra and an analysis made from quadrant to quadrant so as to minimize rib error. One or more quadrants are selected so as to minimize the error in arriving at a density value characteristic of the formation.

The '644 patent suggests that the borehole be broken into four quadrants, bottom, right, top and left. It suggests that such measurements can be made from measurements in the tool itself or from information supplied via a communication bus from another tool. It suggests that information from an accelerometer or a magnetometer that is sent to the density tool is sufficient to break such borehole into four quadrants.

The '644 patent also discloses providing an acoustic caliper in alignment with a density source and detector for determination of standoff in from of the detectors at any given time. Such standoff information is used to minimize error of the density characterization of the formation due to standoff. It is also used to determine cross-sectional divisions of the borehole.

The disclosure of the '644 patent fails to identify a method to accurately determine a bottom contact point of a logging while drilling tool operating in a deviated borehole so as to accurately have information as to where the bottom of the borehole is as the sensors of the tool turn in the borehole.

IDENTIFICATION AND OBJECTS OF THE INVENTION

A primary object of this invention is to provide a logging while drilling method and apparatus by which porosity, density and caliper or other measurements may be made as a function of angular position, or angular distance segment, about a deviated borehole with an accurate determination of the bottom of the borehole.

Another object of the invention is to provide a logging while drilling method and apparatus for determining an indication of lithology of the formation surrounding the borehole as a function of angular position, or angular distance segment, about the borehole.

Another object of the invention is to provide a logging while drilling method and apparatus for determining borehole heterogeneity by comparing formation characteristic measurements of one angular distance segment to another.

SUMMARY OF THE INVENTION

A preferred embodiment of the method and apparatus of the invention includes a logging while drilling tool operatively designed for connection in a downhole drilling assembly above a drill bit. A direction and inclination sub, a downhole electronics sub, and a communication sub, as well as surface instrumentation, are also provided.

The logging while drilling tool of the preferred embodiment of the invention conducts a plurality of recorded measurements as a function of borehole angular distance segments:

compensated bulk density derived from gamma ray detector count rate energy level spectra;

photoelectric effect (PEF) derived from gamma ray detector count rate energy level spectra;

compensated neutron porosity derived from near and far spaced neutron detector measurements in response to neutrons interacting with the formation; and borehole size and shape using an ultrasonic sensor.

Although such measurements are preferably made in quadrants, in principle, the angular distance segments may be a greater or lesser number than four and need not be of equal angular distance.

The invention is applicable to a slick tool, that is, a generally cylindrical tool without stabilizer blades, as well as to a tool with stabilizer blades, that is, a stabilized tool. For a slick tool operating in a deviated borehole, the density of the formation is determined from gamma ray counts while the tool is in a down or bottom quadrant or angular distance segment. When the borehole is deviated or horizontal, the tool touches the bottom portion of the borehole most of the time. Consequently, the standoff for density measurements is at a minimum, and approximately constant, allowing a good spine and rib correction. A measurement of rotational density derived from a statistical analysis of all density information about the borehole is also made.

The down vector of the tool is preferably derived first by determining an angle $\phi$ between a vector to the earth's north magnetic pole, as referenced to the cross sectional plane of a measuring while drilling (MWD) tool and a gravity down vector as referenced in said plane. The logging while drilling (LWD) tool includes magnetometers placed orthogonally in a cross-sectional plane which produces an identical H vector in the logging while drilling tool as measured in the MWD tool. The angle $\phi$ is transmitted to the logging while drilling tool thereby allowing a continuous determination of the gravity down position in the logging while drilling tool. Alternatively, surveys may be performed periodically by the MWD tool when drilling is temporarily halted to add drill pipe to the drill string. Quadrants, that is, angular distance segments, are measured from the down vector.

The angular position of the sensors with respect to the H vector of the LWD tool is continuously updated so that such angular position with respect to the various angular distance segments is always known. Measurement data of the sensors thus is always correlated with one of the angular distance segments. Consequently, measurement data from each of the sensors is acquired as a function of the time of their measurement and spatially per their quadrant position in the borehole.

A computer with a computer program is provided for density data to average the count rate per energy window, per quadrant, and for the entire borehole at each record rate. The record rate is typically 20 seconds and is adjustable. An average density for long and short spacing is determined from such data for the entire borehole and for each quadrant. The spine and ribs compensation technique is applied to derive bulk density and correction factor for the entire borehole and for each quadrant.

The computer also includes a computer program to determine rotational density around the entire borehole and of each of the quadrants. This technique uses the rotation of the LWD tool to compensate for borehole effect. It is used alternatively to the spine and ribs compensation technique.

A first method of computing rotational density is provided by which the variance of the gamma ray count rate data actually measured is compared with the variance expected of a circular borehole. A rotational correction factor is determined. A second method is provided by forming a histogram of gamma ray counts, and extracting only the counts when the detectors touch the formation.

These methods correct the counting rates for the effect of mud between the detector and the formation. This effect can either increase or decrease the counting rates in the detectors, depending upon the mud-formation density contrast.

The invention also permits a determination of whether apparent mud density is greater or less than apparent formation density by incorporating information from an ultrasonic measurement of standoff per quadrant. If the average gamma ray counts in the quadrant with standoff are higher than the average counts in a quadrant with no standoff, then apparent formation density is determined to be higher than the apparent mud density. Therefore, a maximum rotational density is computed using either of the two methods described above.

If the average counts in a quadrant with standoff are lower than the average counts in the quadrant without standoff, then apparent formation density is determined to be lower than apparent mud density. Therefore, a minimum rotational density in computed using either of the two methods described above.

The rotational density technique is applied to derive bulk density and correction factor for the entire borehole and for each quadrant.

The preferred embodiment of the invention also includes a computer program for analysis of gamma ray count data to determine a lithology indicator of the formation photoelectric effect (PEF). The energy window count rates are analyzed to determine average PEF for the entire borehole and for each quadrant, and rotational PEF for the entire borehole and each quadrant is determined in a manner similar to that described above for the determination of rotational density.

Like the density, average porosity for the entire borehole and for each quadrant is determined. A rotational porosity determination is also made for the entire borehole and for each quadrant in a manner similar to that of rotational density and rotational PEF.

An ultrasonic sensor measures standoff between the LWD tool and the borehole wall. A histogram of such standoffs is analyzed to determine minimum and maximum standoff per quadrant. From such standoffs a horizontal diameter, a vertical diameter and a borehole shape determination is made. The borehole standoff values per quadrant are used also in the determination of rotational density, as described above, and in the compensation of neutron detector data to correct neutron porosity determinations for borehole size.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which:

FIG. 2 is a schematic longitudinal cross section of the LWD tool of the invention illustrating a neutron source and neutron detectors, a gamma ray source and gamma ray detectors and an ultrasonic detector, producing formation neutron data, formation gamma ray data and ultrasonic signal data, respectively;

FIG. 3A is a schematic longitudinal cross section of a separate MWD tool having magnetometers and accelerometers placed along orthogonal x and y axes of such tool and a computer for generally continuously or periodically (e.g., at survey times while the drill string is not turning) determining an angle $\phi$ between an H vector and a G vector in a plane of such x and y axes; and further schematically illustrates a downhole electronics module associated with the LWD tool, the illustration showing orthogonal magnetometers placed along x and y axes which are in a plane parallel to the plane of the corresponding axes in the MWD tool;

FIGS. 12D–F illustrate an alternative computer program which may be used in the LWD computer for determining rotational photoelectric effect (PEF) outputs for the entire borehole and for each quadrant;

FIG. 13 illustrates a computer program in the LWD computer which accepts standoff data from the ultrasonic sensor and determines average, maximum and minimum standoff for each quadrant, and determines the horizontal and vertical diameters of the borehole so as to determine the hole shape;

FIGS. 14A and 14B illustrate a computer program in the LWD computer for determination of average neutron porosity, as corrected of standoff, for the entire borehole and for each quadrant.

DESCRIPTION OF THE PREFERRED EMBODIMENT

Introduction

Figure 1:
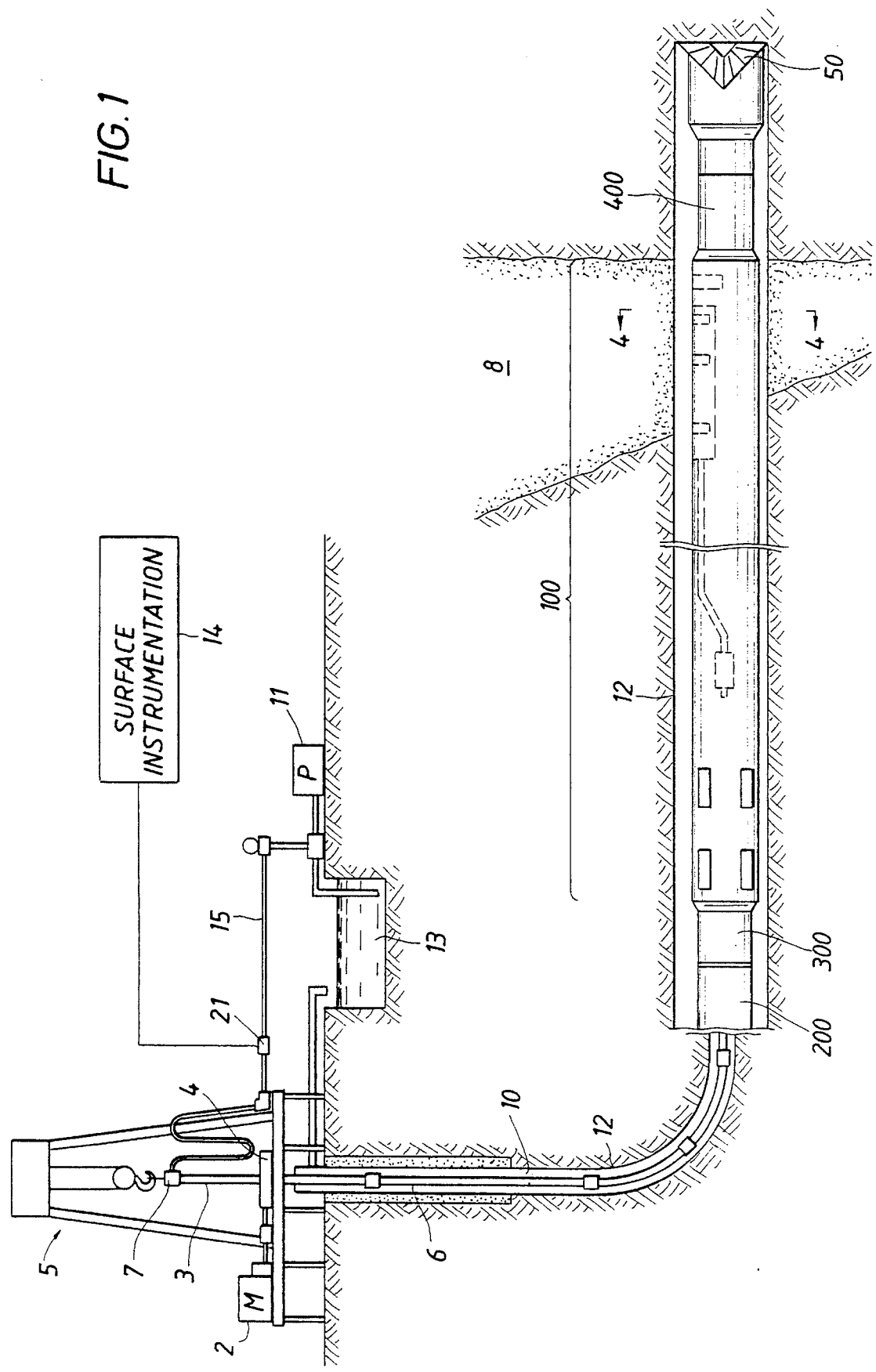
FIG. 1 is a schematic illustration of a downhole logging while drilling (LWD) tool connected in tandem with other measuring while drilling (MWD) tools above a drill bit at the end of a drill string of an oil and gas well in a section of the well which is substantially horizontal.

FIG. 1 illustrates a logging while drilling (LWD) tool 100 connected in tandem with a drilling assembly including drill bit 50. An associated downhole electronics module 300 and MWD tool 200 including magnetometers and accelerometers are also connected in tandem with LWD tool 100. Module 300 may be a separate "sub" or it may be disposed in the body of LWD tool 100. A communication sub 400 is also provided as illustrated in the drilling assembly.

The LWD tool 100 is shown for illustration purposes as being in an inclined portion of a borehole at the end of a drill string 6 which turns in a borehole 12 which is formed in formation 8 by penetration of bit 50. A drilling rig 5 turns drill string 6. Drilling rig 5 includes a motor 2 which turns a kelly 3 by means of a rotary table 4. The drill string 6 includes sections of drill pipe connected end-to-end to the kelly 3 and turned thereby. The MWD tool 200, electronics module 300 and the LWD tool 100 and communication sub 400 are all connected in tandem with drill string 6. Such subs and tools form a bottom hole drilling assembly between the drill string 6 of drill pipe and the drill bit 50.

As the drill string 6 and the bottom hole assembly turn, the drill bit 50 forms the borehole 12 through earth formations 8. Drilling fluid or "mud" is forced by pump 11 from mud pit 13 via stand pipe 15 and revolving injector head 7 through the hollow center of kelly 3 and drill string 6, and the bottom hole drilling assembly to the bit 50. Such mud acts to lubricate drill bit 50 and to carry borehole cuttings or chips upwardly to the surface via annulus 10. The mud is returned to mud pit 13 where it is separated from borehole cuttings and the like, degassed, and returned for application again to the drill string 6.

The communication sub 400 receives output signals from sensors of the LWD tool 100 and from computers in the downhole electronics module 300 and MWD tool 200. Such communications sub 400 is designed to transmit coded acoustic signals representative of such output signals to the surface through the mud path in the drill string 6 and downhole drilling assembly. Such acoustic signals are sensed by transducer 21 in standpipe 15, where such acoustic signals are detected in surface instrumentation 14. The communication sub 400, including the surface instrumentation necessary to communicate with it, are arranged as the downhole and surface apparatus disclosed in U.S. Pat. No.

4,479,564 and U.S. Pat. No. 4,637,479, which patents are incorporated herein by reference.

The communication sub 400 may advantageously include the communication apparatus disclosed in U.S. Pat. No. 5,237,540. Such patent is assigned to the assignee of this application and is incorporated herein by reference.

LWD Tool, MWD Tool and Electronics Module

1. LWD Tool

Figure 4A:
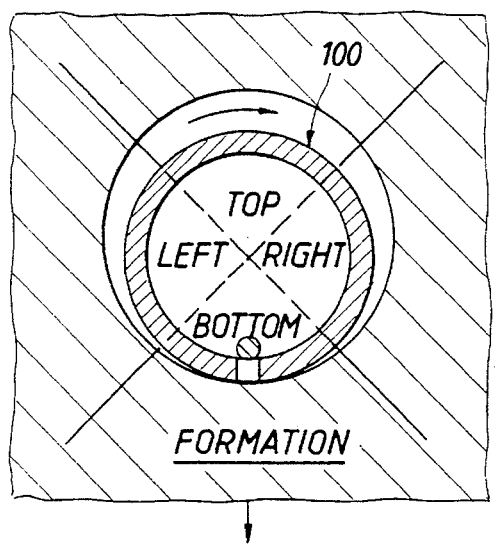
FIG. 4A illustrates a cross sectional view taken along line 4—4 of FIG. 1 showing a generally cylindrical (not stabilized) tool rotating in an inclined borehole, where the borehole has been divided into four equal length angular distance segments-(quadrants) and where the sensor is in a down or bottom position.
Figure 4B:
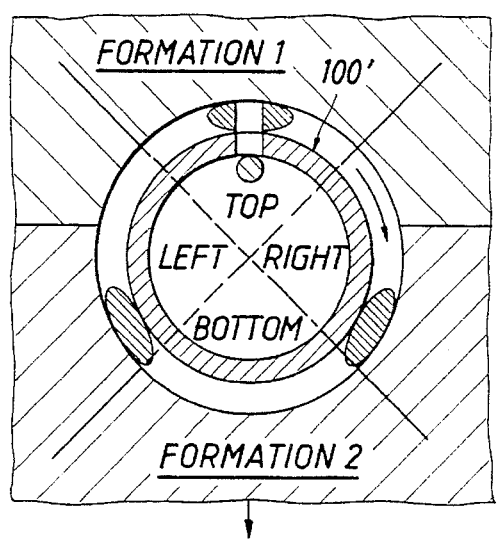
FIG. 4B illustrates a similar cross sectional view as that of FIG. 4A but shows a LWD tool with stabilizing blades such that there is substantially no difference in standoff from the cylindrical portion of the tool to the borehole wall as the tool rotates, and also further showing an example of heterogeneous formations with the borehole having one formation on one side and another formation on the other side, where the borehole may be inclined or substantially vertical.

FIG. 2 illustrates in a schematic way the LWD tool 100 of this invention. The physical structure of the LWD tool body and associated sensors is substantially like that described in U.S. Pat. No. 4,879,463 to Wraight, et al., and U.S. Pat. No. 5,017,778 to Wraight. Both of such patents are assigned to the assignee of the invention described herein. Such patents are incorporated herein for this description of a logging while drilling tool, specifically a compensated density neutron tool used in logging while drilling measurements of formation characteristics. LWD tool 100 hardware as shown in FIG. 1 herein is different in at least two respects: (1) an ultrasonic sensor 112 is added to the assembly and (2) stabilizer blades are not illustrated as being provided for LWD tool 100. The provision of stabilizer blades is, however, an alternative embodiment of the LWD tool 100 as shown in FIG. 4B, where a stabilized tool is used with methods of the invention as described below.

The LWD tool 100 includes a source of neutrons 104 disposed axially, and near and far spaced neutron detectors 101,102. It also includes a source of gamma rays 106 and short and long spaced gamma ray detectors 108, 110. Such LWD tool 100 also includes an ultrasonic transducer 112 for measuring tool standoff from the borehole wall. Such ultrasonic transducer and system is described in U.S. Pat. No. 5,130,950 in the name of Orban, et al., and is also assigned to the assignee of the invention described herein. This patent is also incorporated by reference for its detailed description of an ultrasonic sensor 112 of the LWD tool 100 of this invention.

2. MWD Tool

Figure 3B:
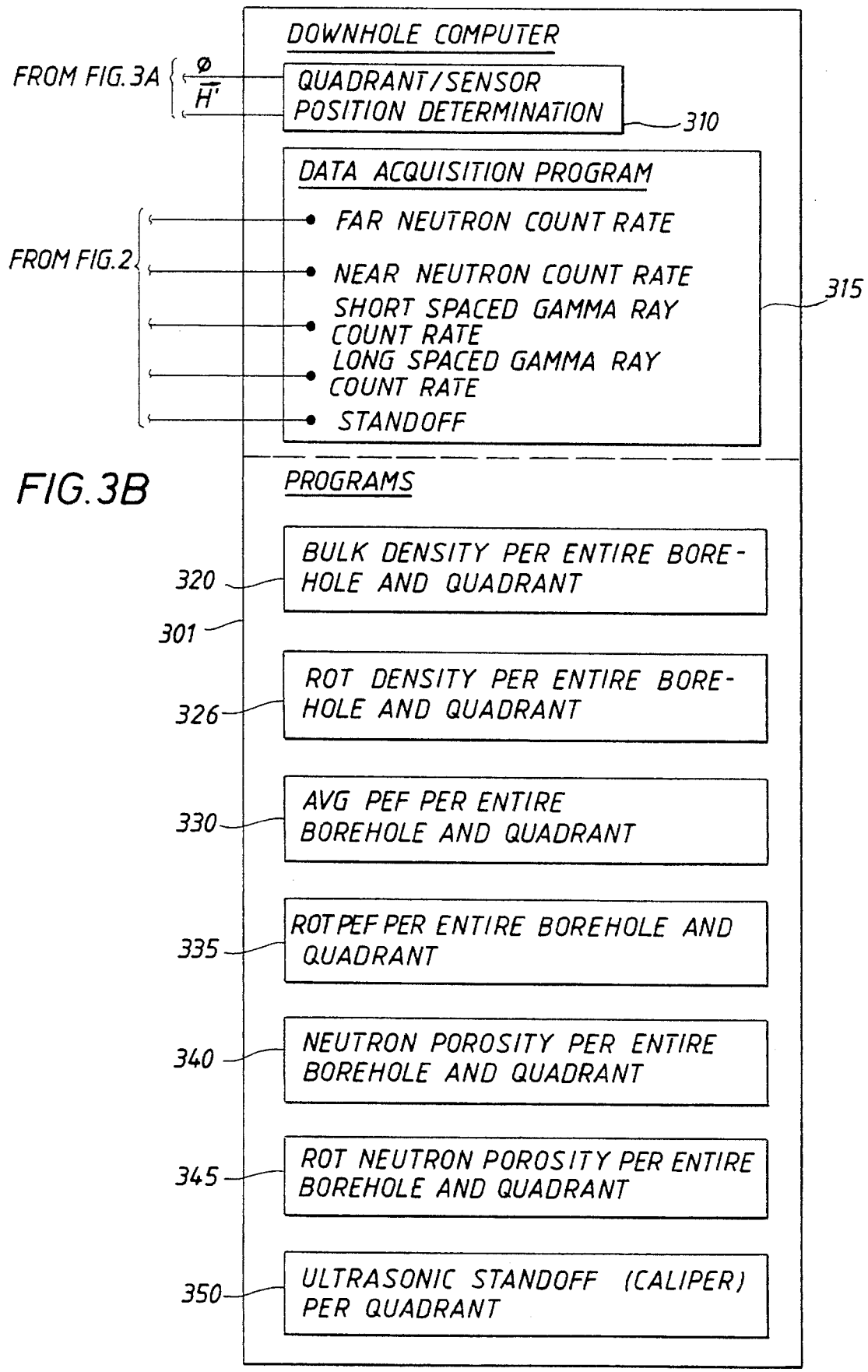
FIG. 3B is a schematic illustration of computer programs in a downhole computer for determining borehole quadrants, sensor position, and for determining bulk density and rotational density, average PEF and rotational PEF, neutron porosity and rotational neutron porosity for the entire borehole and each quadrant, and ultrasonic standoff for each quadrant.

A MWD tool 200 is provided in the bottom hole drilling assembly as schematically indicated in FIG. 1. FIG. 3A schematically illustrates that MWD tool 200 includes magnetometers 201,202 oriented along x and y axes of the tool. Such x and y axes are in the plane of a radial cross section of the tool. A z axis of the tool is oriented along its longitudinal axis. In a similar way, accelerometers $G_x$ and $G_y$ of accelerometer package 208 (which also includes an accelerometer along the z axis of the tool) are oriented along the x and y axes of the tool. A microcomputer 210 responds to $H_y$ and $H_x$ signals and $G_x$ and $G_y$ signals to constantly determine an angle $\phi$ between an $\vec{H}^1$ vector and the $\vec{G}^1$ vector, in the cross sectional plane of MWD tool 200. The $\vec{H}^1$ vector represents that portion of a vector pointed to earth's magnetic north pole which is projected onto the x—y plane of MWD tool 200. The $\vec{G}^1$ vector represents the down component in the cross sectional plane of MWD tool 200, of the earth's gravity vector. As illustrated in FIG. 3B, a signal representative of such angle $\phi$ is constantly communicated to downhole computer 301 of electronics module 300. Its use in determining a down vector of electronics module 300 and LWD tool 100 is described in the description of a Quadrant/Sensor Position Determination computer program 310 presented below.

3. Electronics Module

The electronics module 300 (which, at the option of a designer, may be part of MWD tool 200 or an independent sub) of FIG. 3A includes a magnetometer section 302 and a microcomputer 301. The x and y axes, on which magnetometers of the magnetometer section 302 are oriented, are in a plane which is substantially parallel with the plane of such axes of the MWD tool 200. Accordingly, the $\vec{H}^1$ vector generated by the magnetometer section 302 of electronics module 300 is substantially the same vector $\vec{H}$ determined by computer 210. Accordingly, the computer program 310 has information to determine the down vector angle with respect to a sensor vector as a function of time. A more detailed description of such determination is presented below.

Electronics module 300 receives data from near and far spaced neutron detectors 101 and 102, short and long spaced gamma ray detectors 108, 110 and ultrasonic transducer 112. Ultrasonic transducer 112 is angularly aligned with gamma ray detectors 108, 110 and with gamma ray source 106.

As illustrated in FIG. 3B, downhole computer 301 includes not only the Quadrant/Sensor Position Determination program 310, but also a data acquisition program 315, a bulk density program 320, a rotational density per entire borehole and per quadrant program 326, an average photoelectric effect (PEF) program 330, a rotational PEF program 335, a neutron porosity program 340, a rotational neutron porosity program 345, and an ultrasonic standoff program 350, and others. Such programs transfer data signals among themselves in certain cases, as described below.

Determination of Down Vector, Angular Distance Segments and Angular Position of Sensors 1. Determination of Down Vector $\vec{D}$ with respect to x, y axes FIGS. 5A, 5B, and 6A–F illustrate the determination of a down vector in computer 301 (FIG. 3B). FIG. 4A shows the case of an unstabilized LWD tool 100 which, in an inclined borehole, generally constantly touches the bottom of the borehole. FIG. 4B illustrates the case of a stabilized LWD tool 100'.

Figure 5A:
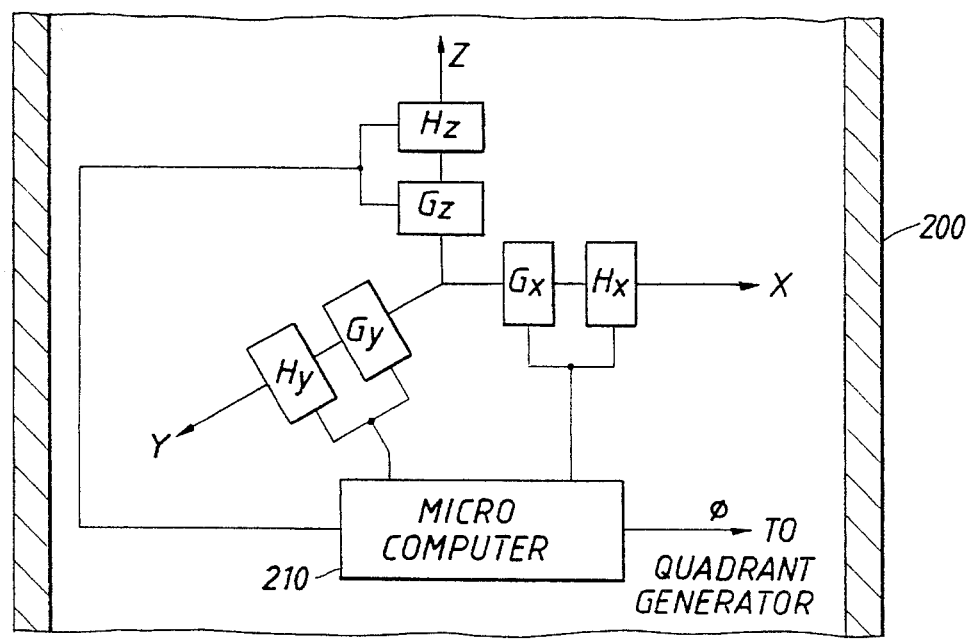
FIG. 5A schematically illustrates magnetometers and accelerometers placed along x, y and z axes of a MWD tool, with a computer accepting data from such instruments to produce an instantaneous angle $\phi$ between a vector of $\vec{H}^1$ of $H_x$ and $H_y$ and a vector $\vec{G}^1$ of $G_x$ and $G_y$.
Figure 5B:
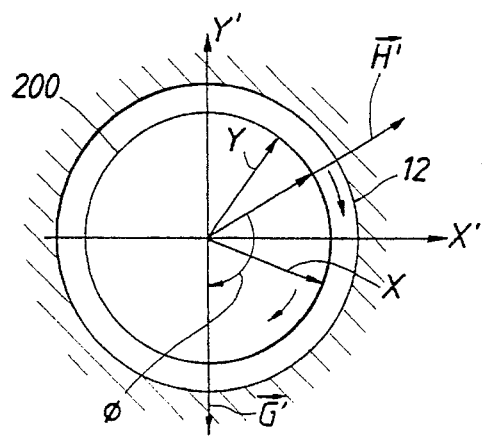
FIG. 5B illustrates a cross section of the MWD tool showing the angle $\phi$ as measured from the $\vec{H}^1$ vector which is constant in direction, but with time has different x and y coordinates while the MWD tool rotates in the borehole.

FIG. 5A illustrates the magnetometers H and the accelerometers G oriented along x, y and z axes of the MWD tool 200. As explained above, an angle $\phi$ is constantly computed between the $\vec{H}^1$ vector (a constantly directed vector, in the x-y plane for the $\vec{H}$ directed vector to earth's magnetic pole) and a $\vec{G}^1$ vector (a constantly directed down vector, in the x-y plane of a vector $\vec{G}$ directed to the earth's gravitational center, i.e., the center of the earth). As FIG. 5B illustrates, MWD tool 200 is rotating in borehole 12. The x and y axes of the tool 200 are rotating at the angular speed of the drilling string, e.g., 30 to 200 revolutions per minute, so the x and y components of the $\vec{H}^1$ vector and the $\vec{G}^1$ vector are constantly changing with time. Nevertheless, the $\vec{H}^1$ and the $\vec{G}^1$ vectors point generally in constant directions, because the borehole direction changes slowly with time during the time that it is being drilled through subterranean rock formations.

Figure 6A:
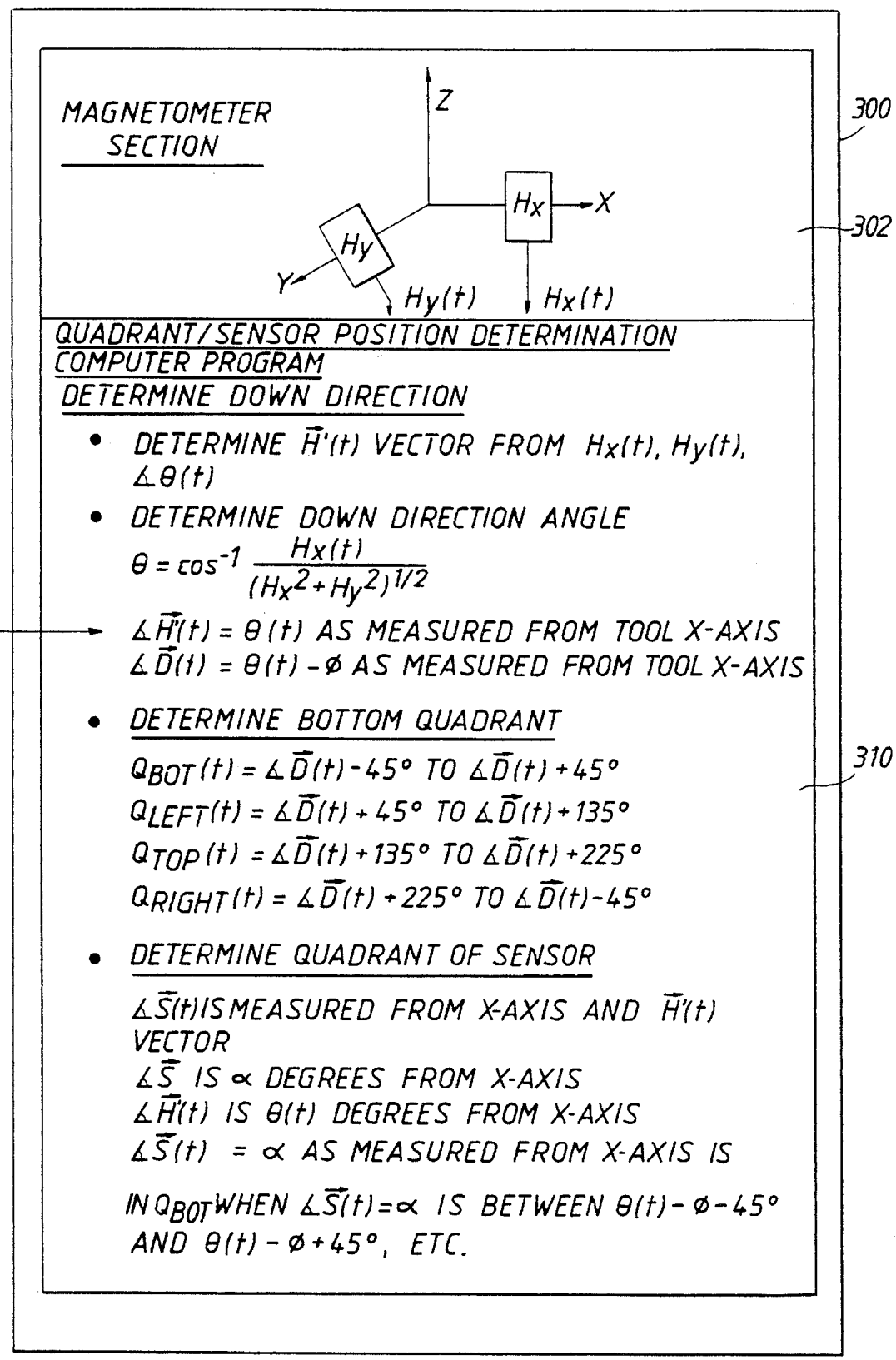
FIG. 6A is an illustration of the magnetometer section and Quadrant/Sensor Position Determination computer program of the electronics module of FIGS. 3A and 3B, such illustration showing the determination of the angle $\theta$ of the vector $\vec{H}^1$ in terms of the $H_x$ and $H_y$ signals from the magnetometers in the electronics module, and further showing the determination of the angle of a down vector $\vec{D}$ as a function of $\theta(t)$ and the angle $\phi$ transferred from the MWD tool, such illustration further showing the determination of quadrants as a function of the angle of the down vector, and such illustration further showing the determination of which quadrant that a sensor is in as it rotates in a borehole.
Figure 6B:
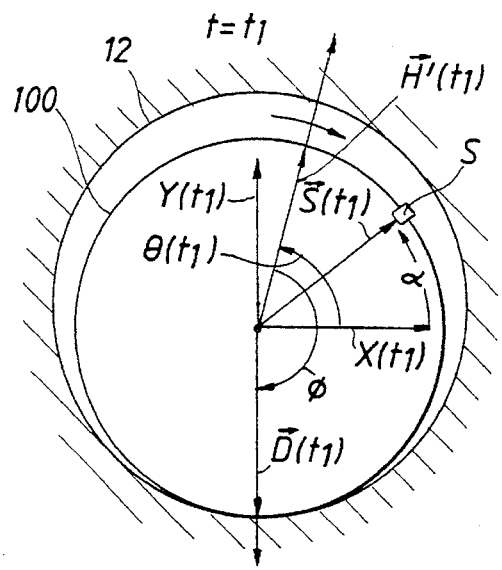
FIGS. 6B–6E illustrate angles from the x and y axes of the LWD tool and from the sensors to the $\vec{H}$ vector as the LWD tool is turning as a function of time in the borehole.
Figure 6C:
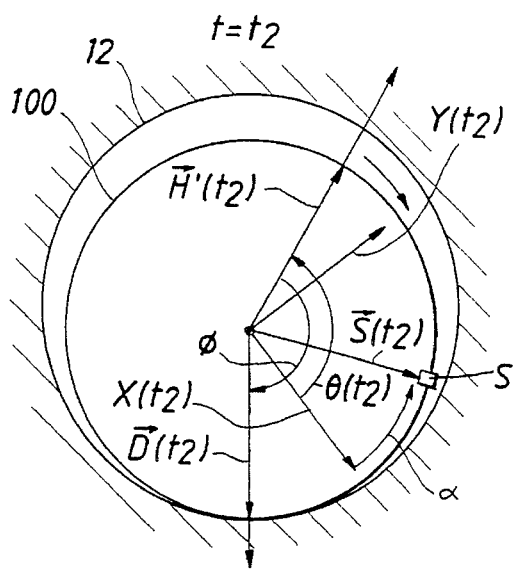
Figure 6D:
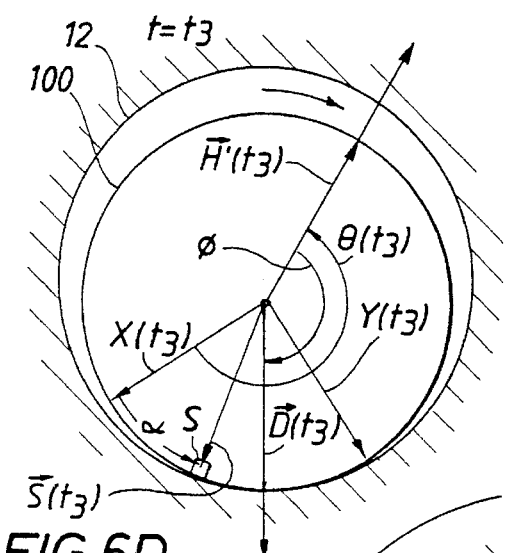
Figure 6E:
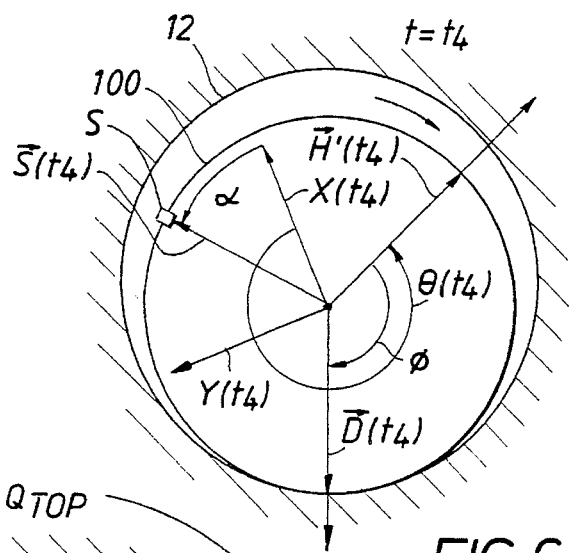

FIG. 6A illustrates the magnetometer section 302 of electronics module 300. Magnetometers $H_x$ and $H_y$ are oriented along x and y axes of the electronics module 300.

Such x and y axes are in a plane which is substantially parallel with the plane of such axes of MWD tool 200. Accordingly, the $H_x$ and $H_y$ signals transmitted from magnetometer section 302 to computer 301 and computer program 310 are used to form a constantly directed reference with respect to an axis of the module, e.g., the x axis.

As FIGS. 6A–6E illustrate, as the MWD tool 200 rotates in borehole 12, an angle θ(t) is constantly formed between the tool x axis and such $\vec{H}^1$ vector. The angle θ(t) is determined from the $H_x$ and $H_y$ signals from magnetometer section 302 of electronics module 300:

Next, the down vector angle, angle $\vec{D}(t)$ is determined in Quadrant/Sensor Position $$\Theta(t) = \cos^{-1}\left[\frac{H_x(t)}{\sqrt{(H_x(t)^2 + H_y(t)^2)}}\right]$$

Determination program 310, as a function of the x and y axes and time, by accepting the angle from the MWD tool 200. The angle of the down vector is determined in program 310 as, $$\text{angle} \vec{D}(t) = \Theta(t) - \phi$$

FIGS. 6B–E illustrate the position of MWD tool 200 and electronics module 300/LWD tool 100 in borehole 12 at several times, $t_1$, $t_2$, $t_3$, $t_4$ as it rotates. The angle θ(t) varies with time, because it is measured from the x axis of the MWD tool 200 (and of the electronics module 300/LWD tool 100) to the $\vec{H}$ vector. The angle φ is constant from the $\vec{H}^1$ vector to the $\vec{D}$ vector.

2. Determination of Angular Distance Segments

FIG. 6A further illustrates generation of angular distance segments around the borehole. The term "quadrant" is used to illustrate the invention where four ninety degree angular distance segments are defined around the 360° circumference of the MWD tool 200 or the LWD tool 100. Other angular distance segments may be defined, either lesser or greater in number than four. The angular distance of such segments need not necessarily be equal.

In a preferred embodiment of the invention however, quadrants are defined as illustrated in the computer program representation of the Quadrant/Sensor Position Determination program 310. A bottom quadrant $Q_{BOT}(t)$ is defined as extending forty-five degrees on either side of the down vector $\vec{D}(t)$. Left quadrant, $Q_{LEFT}(t)$, top quadrant, $Q_{TOP}(t)$ and right quadrant, $Q_{RIGHT}(t)$ are defined as in FIG. 6A.

3. Determination of Angular Position of Sensors

As FIGS. 6B–E further illustrate, the sensors S (e.g., short and long spaced gamma ray detectors 108, 110, ultrasonic transducer 112 and near and far spaced neutron detectors 101, 102) are oriented at a known angle α from the x axis. Thus, the angle of the sensor is a constant angle α as measured from the x axis of the electronics module or sub 300. Accordingly, computer program 310 determines which quadrant a sensor is in by comparing its angle from the x axis with the quadrant definition with respect to the x axis. For example, sensors S are in $Q_{BOT}$ when α is between θ(t)-φ-45° and θ(t)-φ+45°. Sensors S are in $Q_{TOP}$ when α is between θ(t)-$^{SM}$-135° and θ(t)-φ-225°, and so on.

Figure 6F:
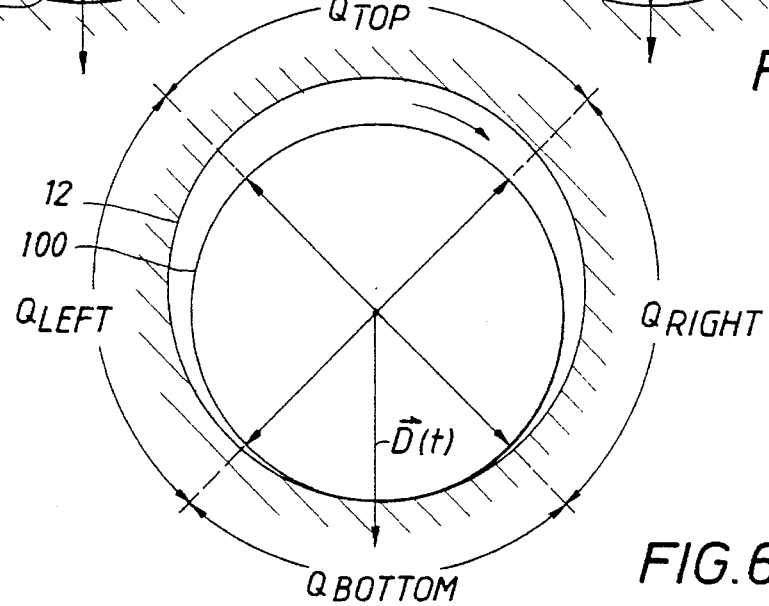
FIG. 6F illustrates dividing the borehole into four segments, where a bottom segment or quadrant is defined about the down vector $\vec{D}$.

FIG. 6F further illustrates the down vector $\vec{D}$ and four quadrants, $Q_{BOT}$, $Q_{RIGHT}$, $Q_{TOP}$, and $Q_{LEFT}$ which are fixed in space, but are defined as a function of time with the turning x and y axes of MWD tool 200.

Figure 7:
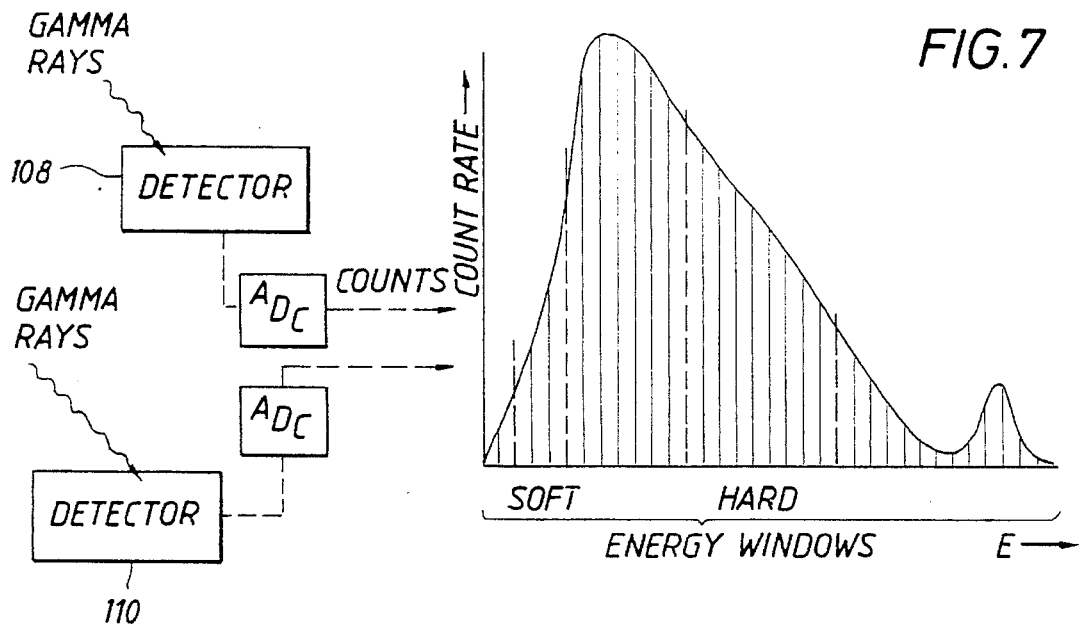
FIG. 7 illustrates long and short spaced gamma ray detectors with apparatus for accumulating count rates in soft and hard energy windows.

Determination of Bulk Density and Δρ Correction Factors for Entire Borehole and for Quadrants 1. Gamma Ray Data Acquisition by Energy Window, Time and by Quadrant FIG. 7 is a pictorial representation of gamma rays returning from the formation which are detected by gamma ray detectors. The detectors 108 and 110 produce outputs representative of the number of counts per energy window of the counts as reflected in the number and magnitude of the gamma rays detected by detectors 108, 110. Such outputs are directed to analog to digital devices (ADC's) and stored in the memory of downhole computer 301. An illustration of the storage of the rates of such counts, as a function of energy windows, is also illustrated in FIG. 7. Certain lower energy windows are designated "soft" windows. Certain higher energy windows are designated "hard" windows as illustrated in FIG. 7.

Figure 8:
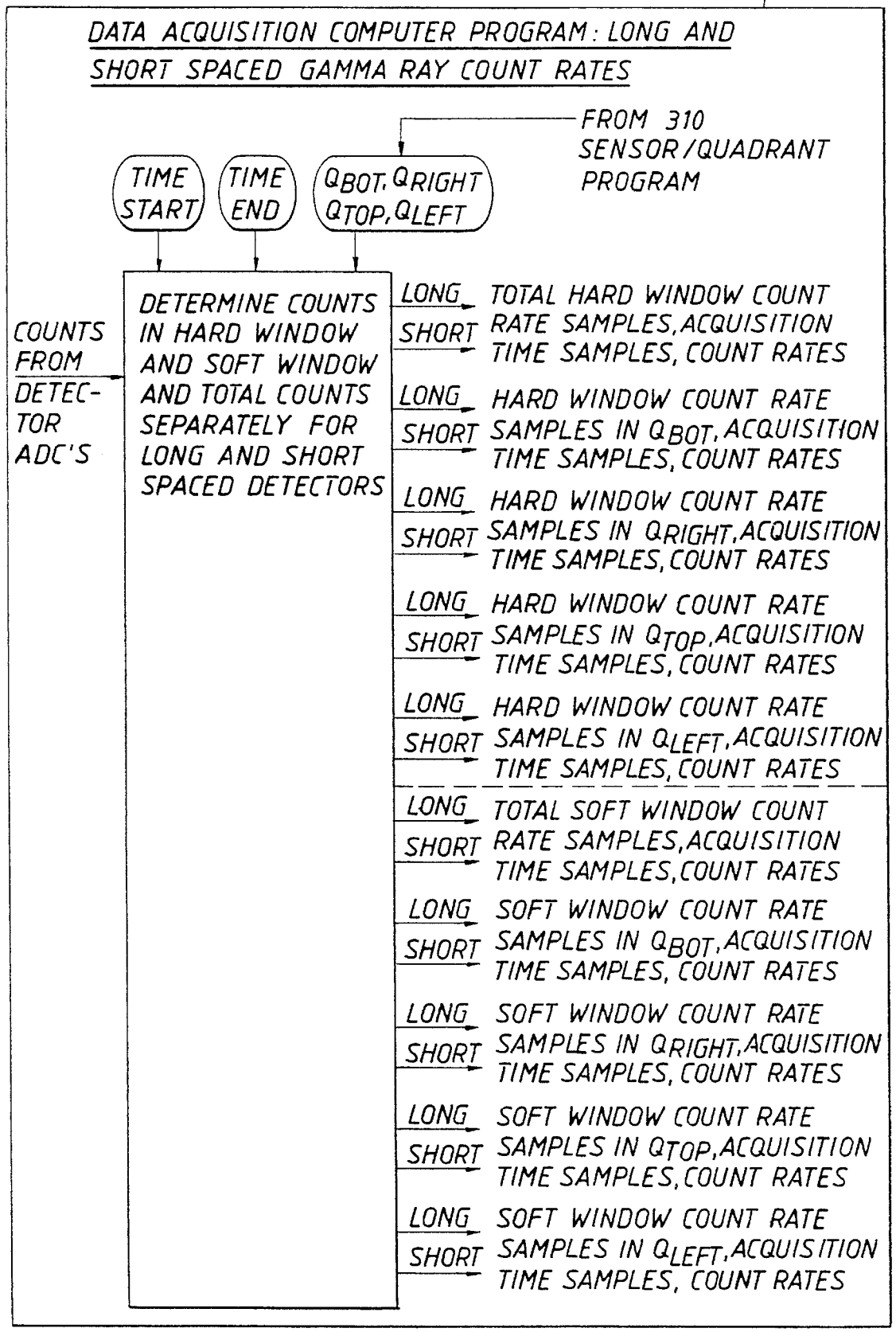
FIG. 8 illustrates a computer program of the LWD computer for determining the number of count rate samples per quadrant in hard windows and in soft windows as well as the total count rate samples for both the long and short spaced gamma ray detectors, acquisition time samples and count rates.

FIG. 8 illustrates that part of a data acquisition computer program 3 15 of computer 301 which accepts counts from the ADC's in response to detectors 108, 110. It also accepts starting times and end times for the accumulating of the total number of counts in each energy window for (1) the short spaced detector and (2) the long spaced detector as a function of the entire borehole and for each quadrant. The total acquisition time is also collected for the entire borehole, that is all counts, and for the acquisition time for each quadrant. Such outputs are for hard window counts as well as soft window counts. Computer program 315 also calculates count rates for all samples.

2. Bulk Density and Δρ Correction Determination

Figure 9:
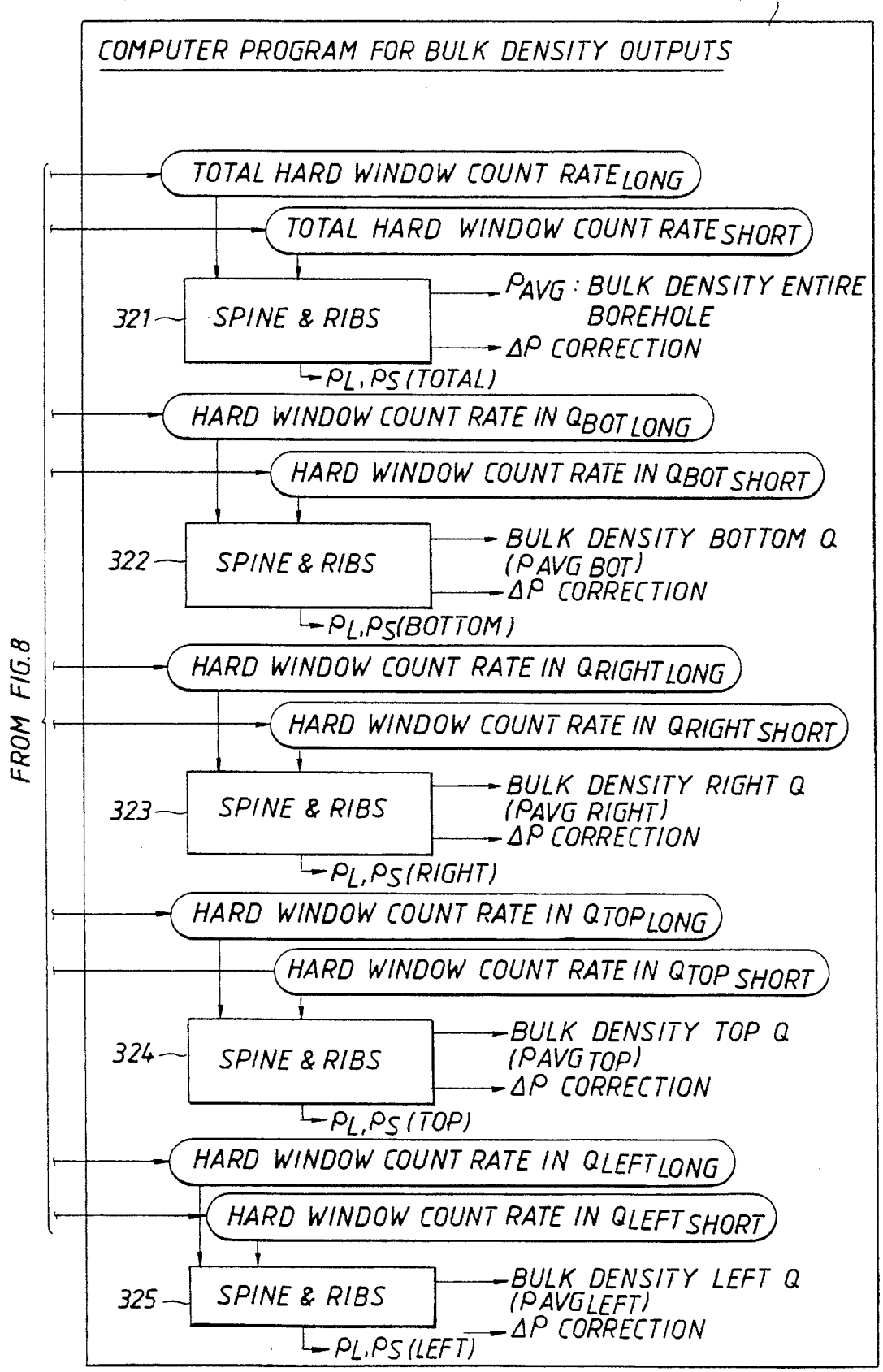
FIG. 9 illustrates a computer program of the LWD computer for determining the long and short spacing densities, the bulk density and $\Delta\rho$ correction factor determined by a spine and ribs technique for the entire borehole and for each of the bottom, right, top and left quadrants.

FIG. 9 illustrates computer program 320 of downhole computer 301 of electronics module 300 which accepts count rate signals of long and short spaced gamma ray detectors for hard window counts by angular distance segment (i.e., quadrant). Accordingly, as shown schematically in FIG. 9, a sub program 321, called "SPINE AND RIBS" receives digital data signals representative of the total hard window count rate for the entire borehole from both the long and short spaced detectors and determines long spacing density $\rho_L$, short spacing density $\rho_S$, bulk density $\rho_{AVG}$ and Δρ correction. A spine and ribs correction technique is well known in the nuclear well logging art of density logging. Such correction technique is based on a well known correction curve by Wahl, J. S., Tiltman, J., Johnstone, C. W., and Alger, R. P., "The Dual Spacing Formation Density Log", presented at the Thirty-ninth SPE Annual Meeting, 1964. Such curve includes a "spine" which is a substantially linear curve relating the logarithm of long spacing detector count rates to the logarithm of short spacing detector count rates. Such curve is marked by density as a parameter along the curve. "Ribs" cross the spine at different intervals. Such ribs are experimentally derived curves showing the correction necessary for different mudcake conditions.

The spine and ribs computer program is repeated as at 322, 323, 324 and 325 to determine long spacing density $\rho_L$, short spacing density $\rho_S$, bulk density $\rho_{AVG}$ and Δρ correction for each quadrant based on the hard window count rates of the long and short spaced detectors for each quadrant.

Figure 10B:
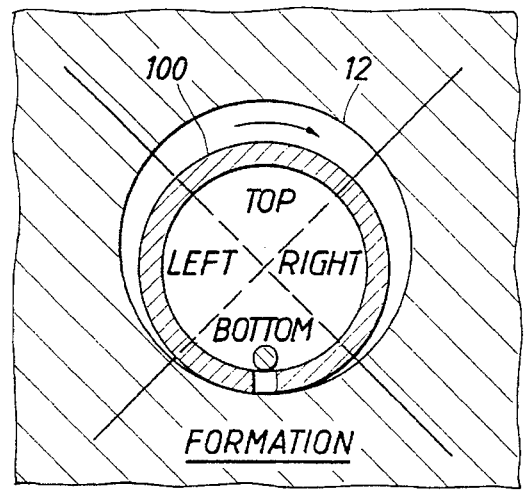
FIG. 10B illustrates a LWD tool rotating in an inclined borehole.
Figure 10C:
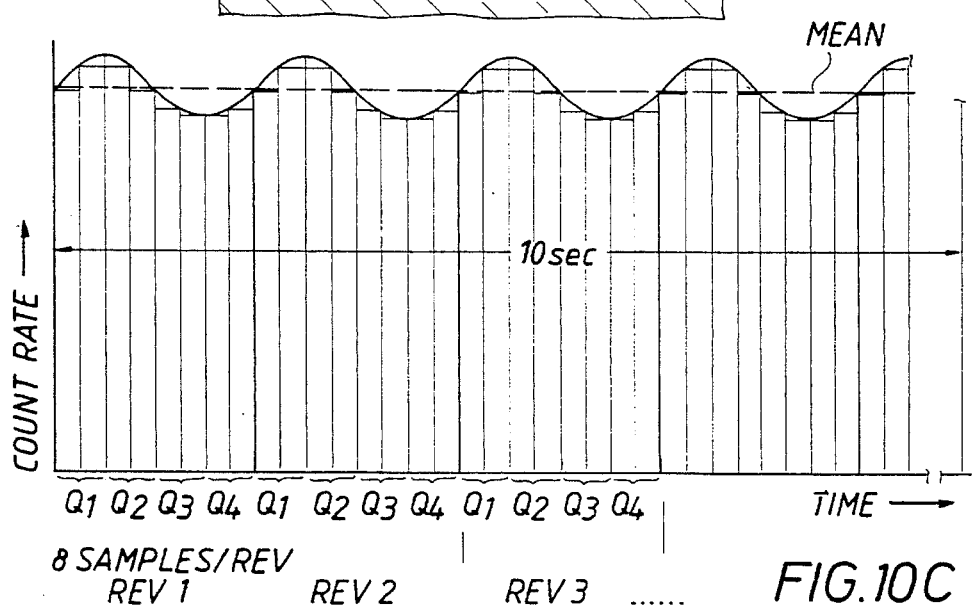
FIG. 10C illustrates count rates per quadrant where such count rates are fluctuating from quadrant to quadrant.
Figure 10A:
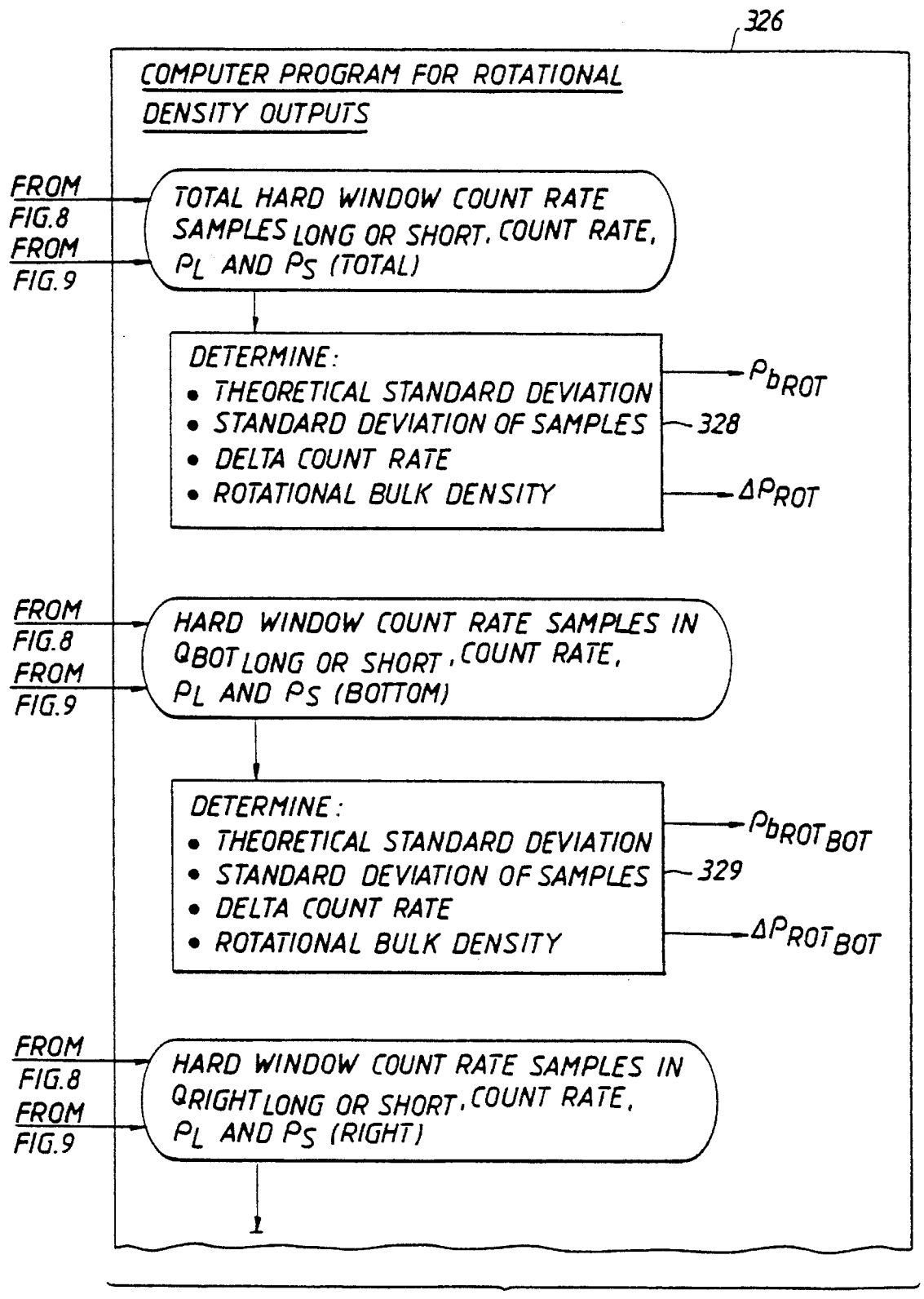
FIGS. 10Aa and 10Ab illustrate a computer program of the LWD computer for determining rotational density output and $\Delta\rho_{ROT}$ correction factors.
Figure 10A:
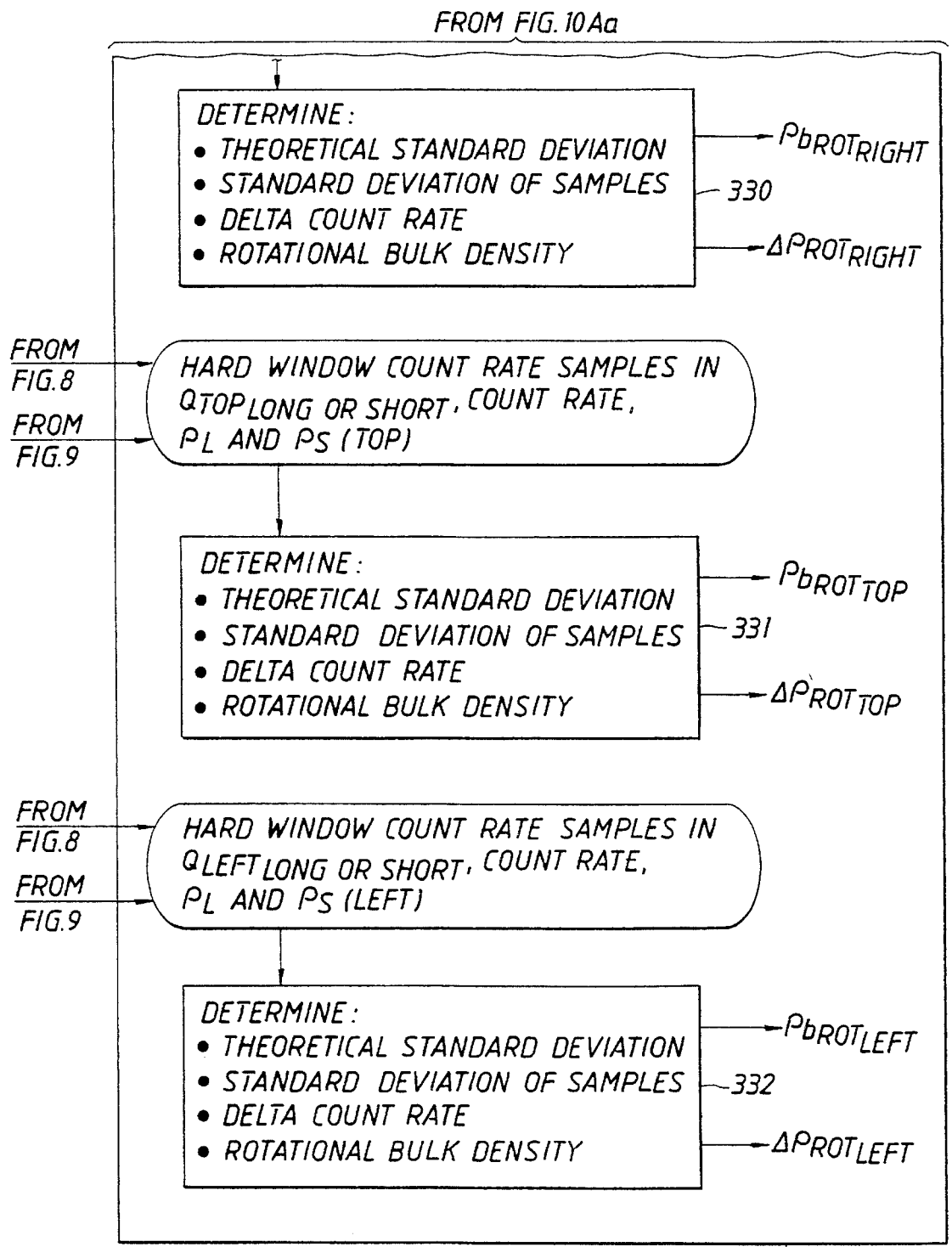

Determination of Rotational Density $\rho_{b\ ROT}$ and
$\Delta\rho_{ROT}$ Correction for Entire Borehole and for
Quadrants FIGS. 10Aa and 10Ab illustrate computer program 326 in downhole computer 301 which determines rotational density, called $\rho_{b\ ROT}$ and $\Delta\rho_{ROT}$ correction for each quadrant and for the entire borehole. The method is described for an entire borehole in U.S. Pat. No. 5,017,778 to Wraight, such patent being incorporated by reference into this specification. Such patent is also described in a paper by D. Best, P. Wraight, and J. Holenka, titled, AN INNOVATIVE APPROACH TO CORRECT DENSITY MEASUREMENTS WHILE DRILLING FOR HOLE SIZE EFFECT, SPWLA 31st Annual Logging Symposium, Jun. 24–27, 1990.

For the entire borehole, signals representing total hard window count rate samples from the long spaced or, alternatively, the short spaced gamma ray detector, and count rate are transferred from data acquisition computer program 315 (FIG. 8). Long and short spacing densities, $\rho_L$ and $\rho_S$, are transferred from computer program 320 (FIG. 9). A sub program 328 determines a theoretical or circular hole standard deviation (or variance), determines a standard deviation of the measured samples of collected data, and determines a delta count rate, $\Delta CR$, as a function of the variance between the measured standard deviation and the theoretical standard deviation of a circular hole. Next, a rotational bulk density digital signal $\rho_{b\ ROT}$ is determined. Digital signals representative of $\Delta\rho_{ROT}$ and $\rho_{b\ ROT}$ are output.

Figure 10D:
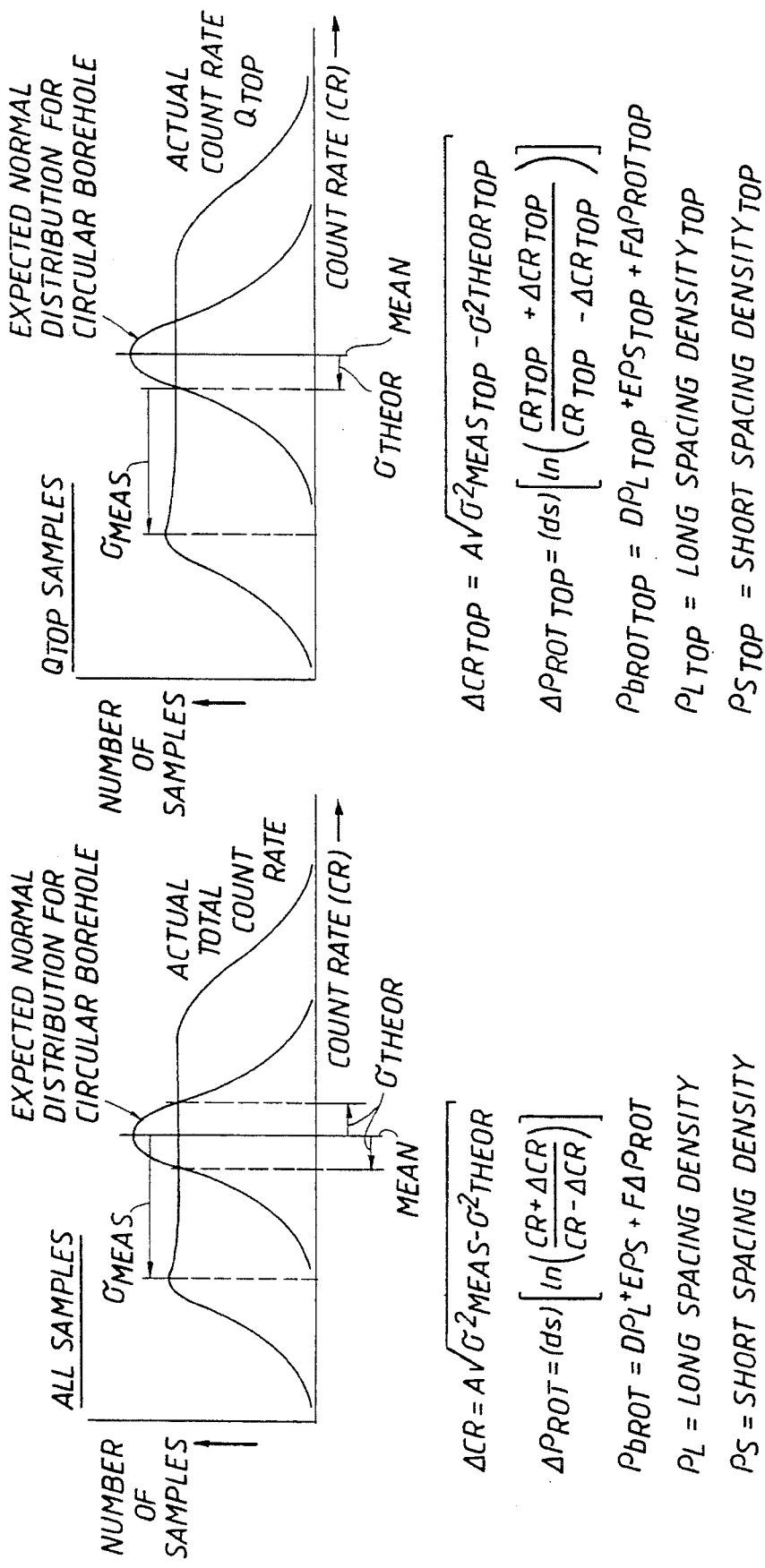
FIG. 10D illustrates an example of the entire borehole distribution of the number of samples as a function of count rate for the inclined hole of FIG. 10B and for an expected distribution of count rates for a circular borehole, and by way of illustration for a particular quadrant $Q_{TOP}$, the method of determining $\Delta\rho_{ROT}$ and $\rho_{b\ ROT}$ for the entire borehole and for each quadrant.

FIGS. 10B, 10C and 10D illustrate the method. FIG. 10B again shows an unstabilized LWD tool 100 rotating in borehole 12. FIG. 10C illustrates long spacing or, alternatively, short spacing hard window count rates of the LWD tool 100 as a function of time. As indicated in FIG. 10C, the time that the detector is in various quadrants (or angular distance segments referenced here as $Q_1$, $Q_2$ . . .) is also shown. For a non-round hole, especially for a nonstabilized tool 100, the count rates fluctuate about a mean value for each revolution of the tool. In FIG. 10C, eight samples per revolution are illustrated. Data collection continues for 10 to 20 seconds.

FIG. 10D illustrates the method of computer program 328 for determining $\rho_{b\ ROT}$ and $\Delta\rho_{ROT}$ for the entire borehole. First, a mean (average) and theoretical standard deviation ($\sigma_{theor}$) for a normal distribution from a circular borehole with a stabilized tool is estimated. Next, a histogram or distribution of the number of samples versus count rate measured (CR) is made and a mean and measured standard deviation ($\sigma_{meas}$) for all actual counts collected during an actual acquisition time is made. A delta count rate factor $\Delta CR$ is determined:

$$\Delta CR = A \sqrt{\sigma^2_{meas} - \sigma^2_{theor}}$$

where A is a constant which is a function of the data sampling rate.

Next the $\Delta\rho_{ROT}$ factor is determined:

$$\Delta\rho_{ROT} = (ds)\left[\ln\left(\frac{CR + \Delta CR}{CR - \Delta CR}\right)\right]$$

where ds is detector sensitivity.

Finally, the rotational bulk density is determined:

$$\rho_{b\ ROT} = D\rho_L + E\rho_S + F\Delta\rho_{ROT}$$

where D, E, and F are experimentally determined coefficients;

$\rho_L$ = long spacing density obtained as illustrated in FIG. 9; and $\rho_S$ = short spacing density obtained as illustrated in FIG. 9.

As indicated in FIGS. 10C and 10D also, such $\rho_{b\ ROT}$ factor and $\Delta CR$ factor is also determined in the same way for each quadrant, but of course, rather than using all of the samples of FIG. 10C, only those samples collected in the $Q_{TOP}$ quadrant, for example, are used in the determination. As indicated in FIGS. 10A$a$ and 10A$b$, the $\Delta\rho_{ROT}$ factor and $\rho_{b\ ROT}$ value are determined, according to the invention, for the entire borehole and for each quadrant.

Figure 11A:
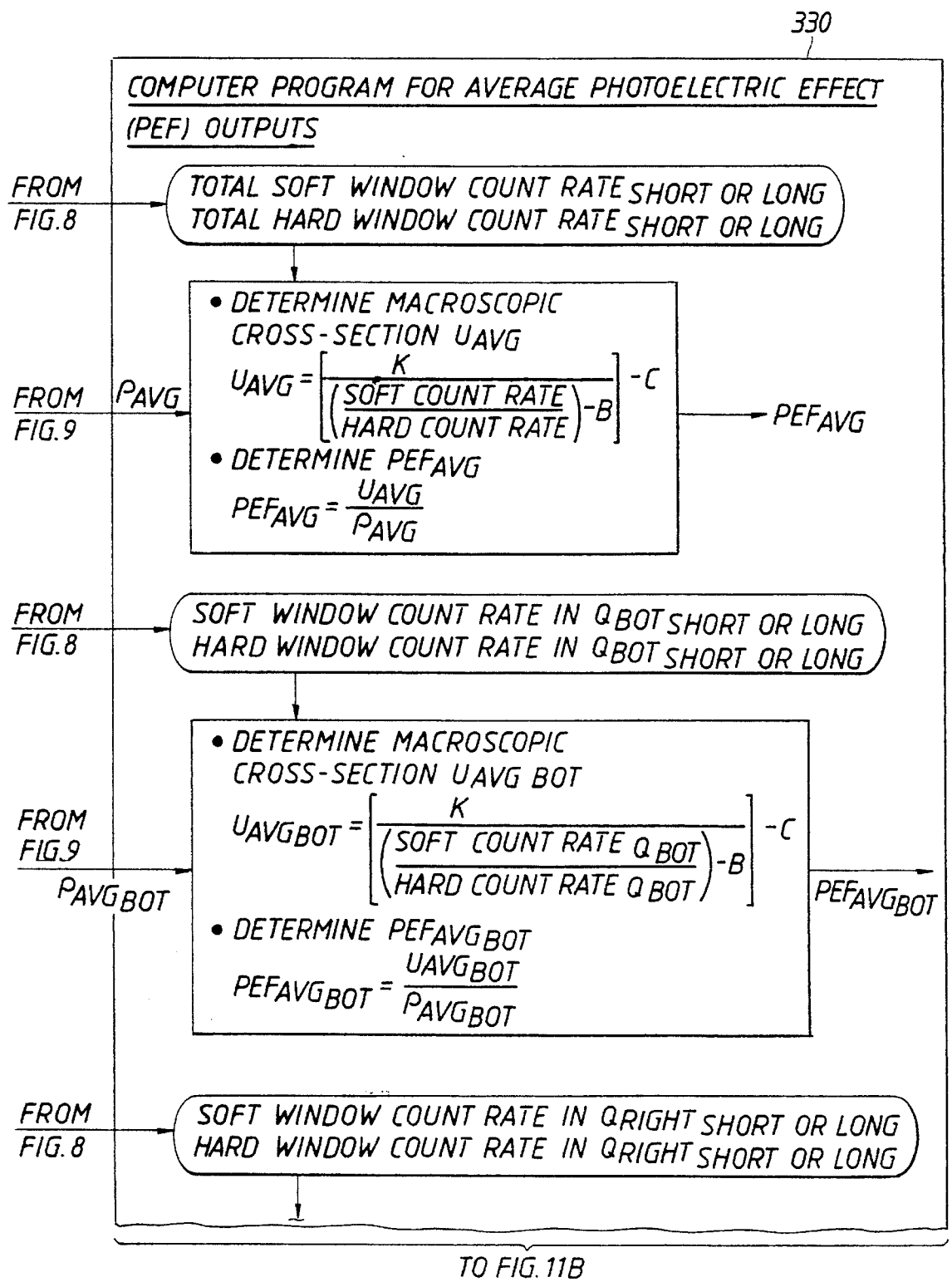
FIGS. 11A and 11B illustrate a computer program in the LWD computer for determining the average photoelectric effect (PEF) for the entire borehole and for each of the quadrants.
Figure 11B:
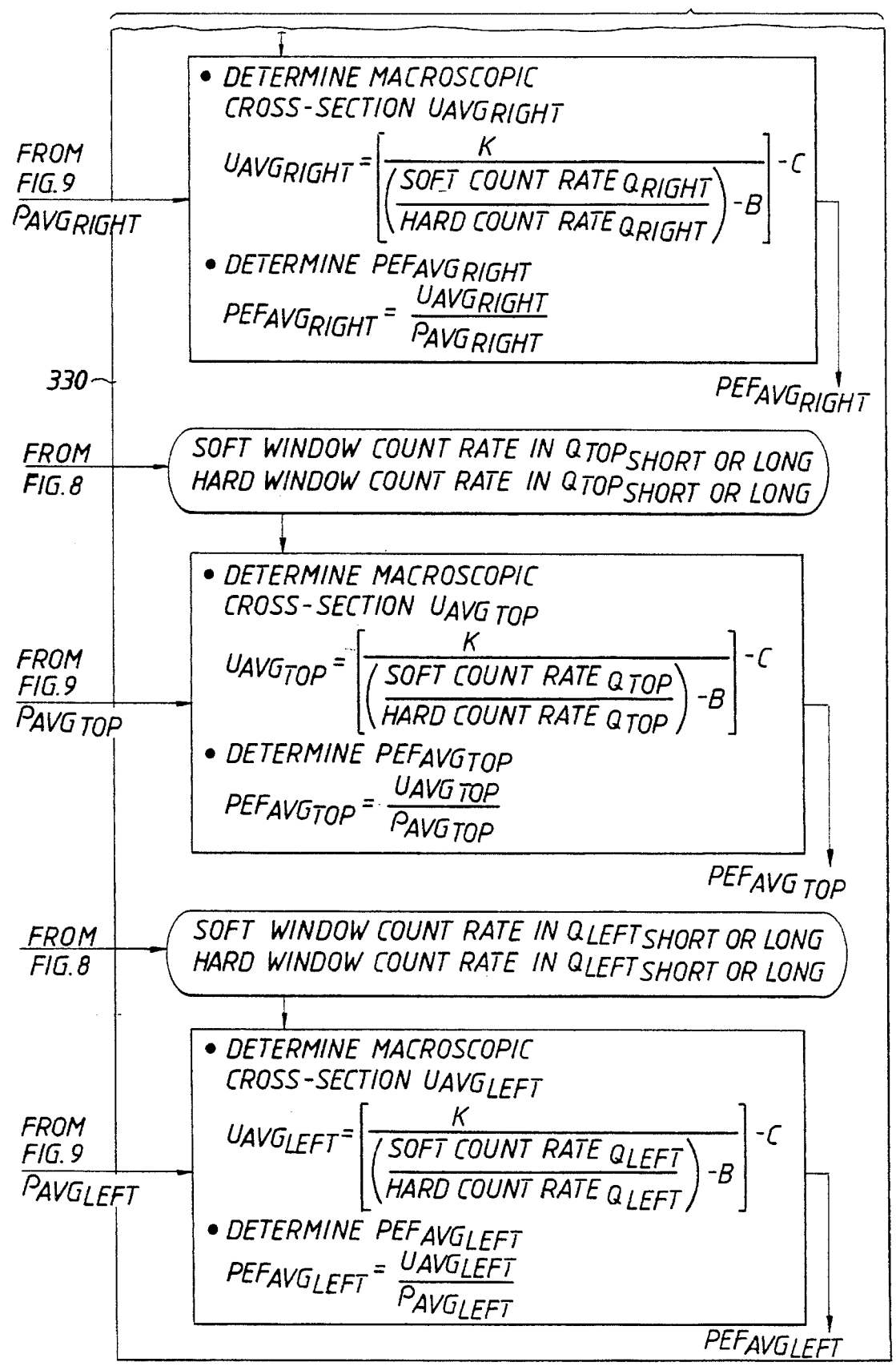

Determination for Average and Rotational Photoelectric Effect (PEF) Outputs for Entire Borehole and as a Function of Quadrants 1. Determination of $PEF_{AVG}$ FIGS. 11A and 11B illustrate computer program 330 which determines photoelectric effect parameters as, alternatively, a function of short spaced detector soft window count rate and short spaced detector hard window count rate or long spaced detector soft window count rate and long spaced detector hard window count rate. Using the short spaced or long spaced detector count rate for the entire borehole and the $\rho_{AVG}$ as an input from computer program 320, the factor $$PEF_{AVG} = \frac{U_{AVG}}{\rho_{AVG}}$$

is determined, where the macroscopic cross-section, $$U_{AVG} = \left[\frac{K}{\left(\frac{\text{SOFT COUNT RATE}}{\text{HARD COUNT RATE}}\right) - B}\right] - C$$

The terms K, B and C are experimentally determined constants.

In a similar manner, as shown in FIGS. 11A and 11B, the $U_{AVG\ BOT}$, $U_{AVG\ RIGHT}$, $U_{AVG\ TOP}$, and $U_{AVG\ LEFT}$ are determined from short spaced or long spaced detector soft and hard window count rates while the sensor is in the bottom, right, top and left quadrants, respectively.

2. Determination of Rotational PEF

Figure 12A:
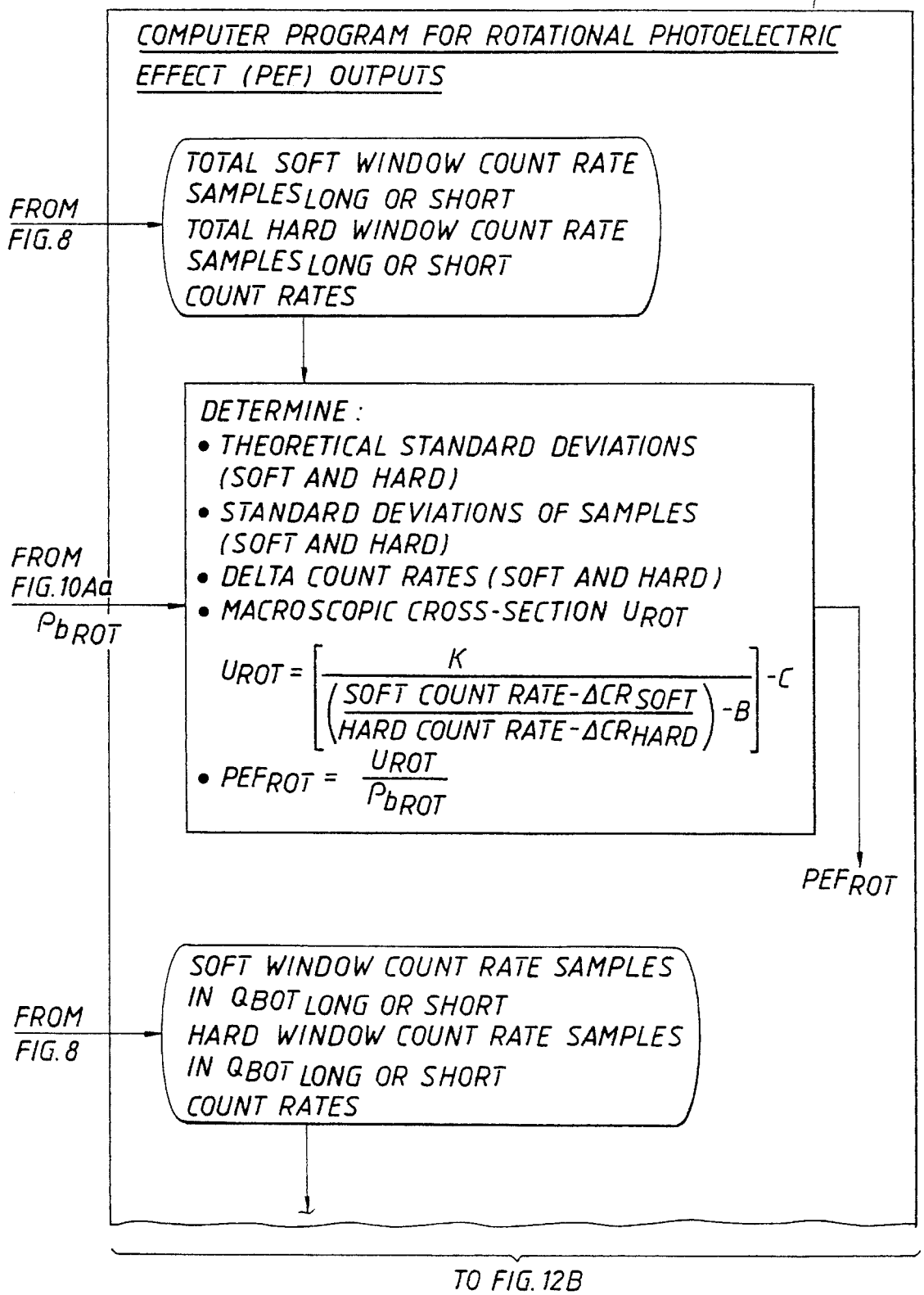
FIGS. 12A–C illustrate a computer program in the LWD computer for determining rotational photoelectric effect (PEF) outputs for the entire borehole and for each quadrant.
Figure 12B:
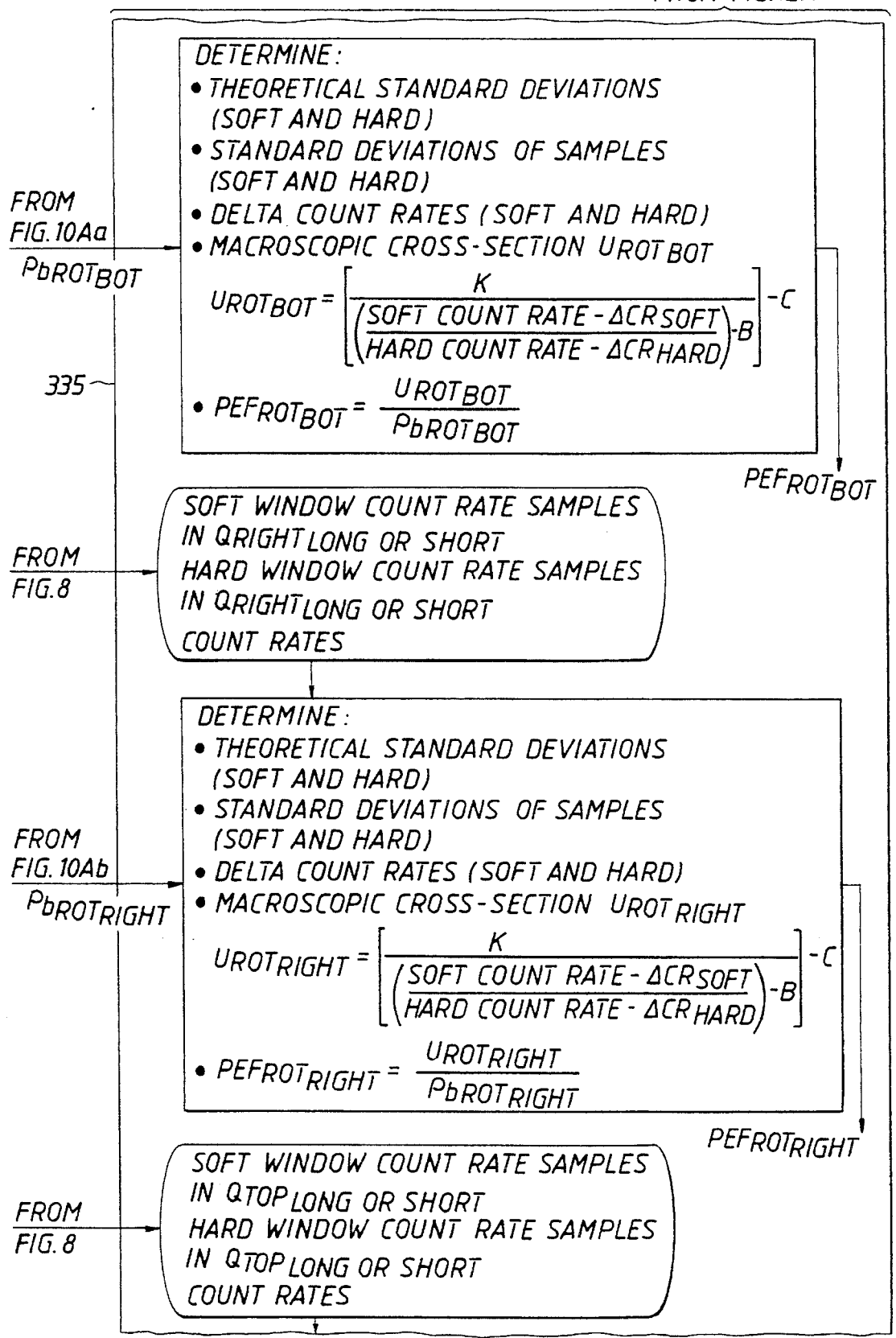
Figure 12C:
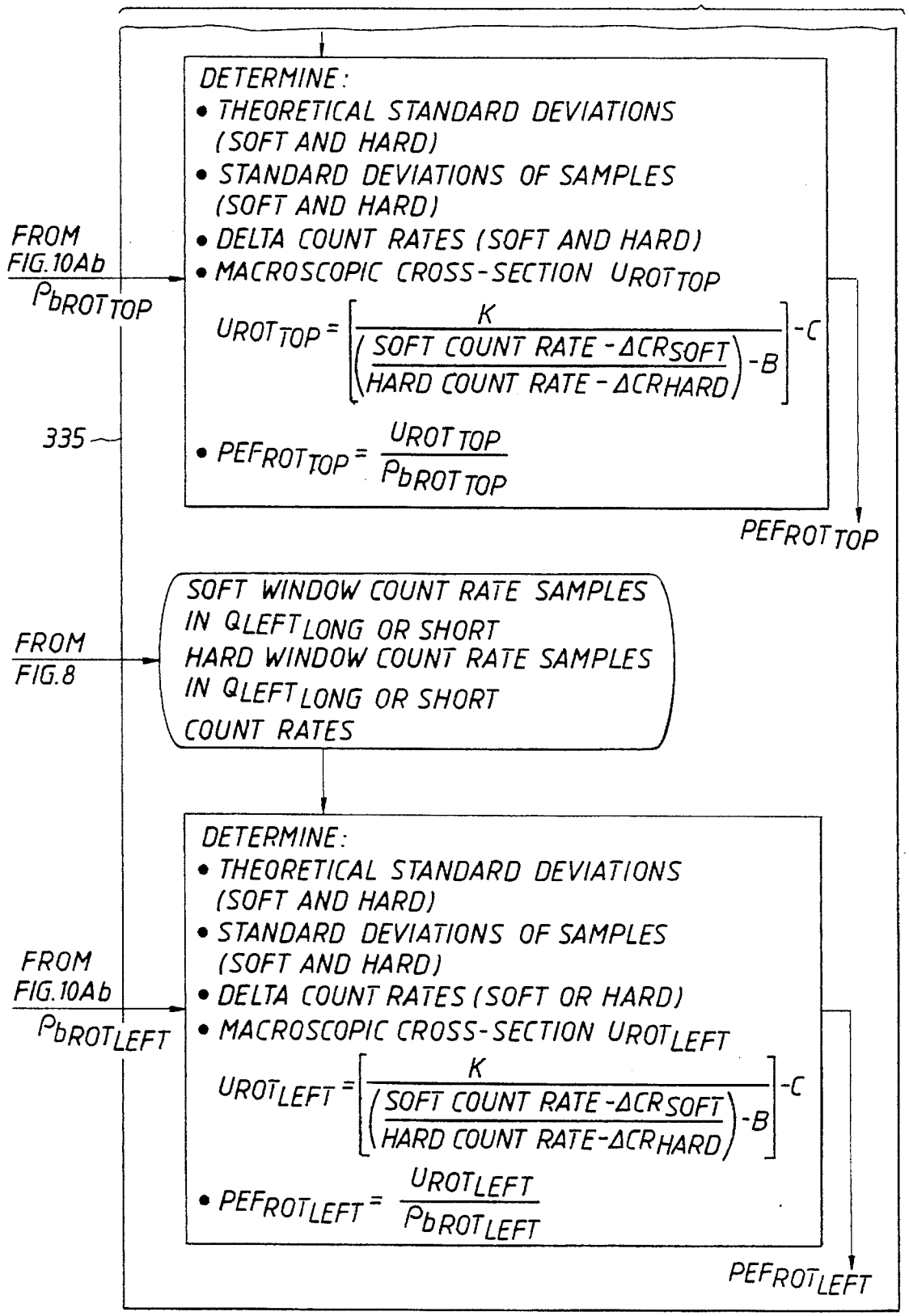

FIGS. 12A–C illustrate computer program 335 in downhole computer 301. The total soft and hard window count rate distributions from the long spaced or, alternatively, the short spaced gamma ray detector, and the corresponding count rates are accumulated.

In a manner similar to that described above with regard to the calculation of rotational density, a $\Delta CR_{SOFT}$ factor is determined from the soft count rate distribution, $$\Delta CR_{SOFT} = A\sqrt{\sigma^2_{meas} - \sigma^2_{theor}}$$

where A is a constant which is a function of the data sampling rate. Similarly, a $\Delta CR_{HARD}$ is determined from the hard count rate distribution. Next, macroscopic cross-section, $U_{ROT}$, and $PEF_{ROT}$ factors are determined:

$$U_{ROT} = \left[\frac{K}{\left(\frac{\text{SOFT COUNT RATE} - \Delta CR_{SOFT}}{\text{HARD COUNT RATE} - \Delta CR_{HARD}}\right) - B}\right] - C$$

where K, B and C are experimentally determined constants, and $$PEF_{ROT} = \frac{U_{ROT}}{\rho_{b\ ROT}}$$

where $\rho_{b\ ROT}$ is determined in computer program 328 as illustrated in FIGS. 10Aa, 10Ab and 10D.

In a similar manner, the $PEF_{ROT}$ factor for each quadrant is also determined, as illustrated in FIGS. 12A–C.

The PEF is an indicator of the type of rock of the formation. Accordingly, $PEF_{AVG}$ is an indicator of the type of rock, on the average, of the entire borehole. The $PEF_{AVG}$ per quadrant is an indicator of the type of rock per each quadrant and hence heterogeneity of the formation. $PEF_{ROT}$ signals, as determined by program 335 (FIGS. 12A–C) provide further information as to the kind of rocks of the formation.

Figure 12D:
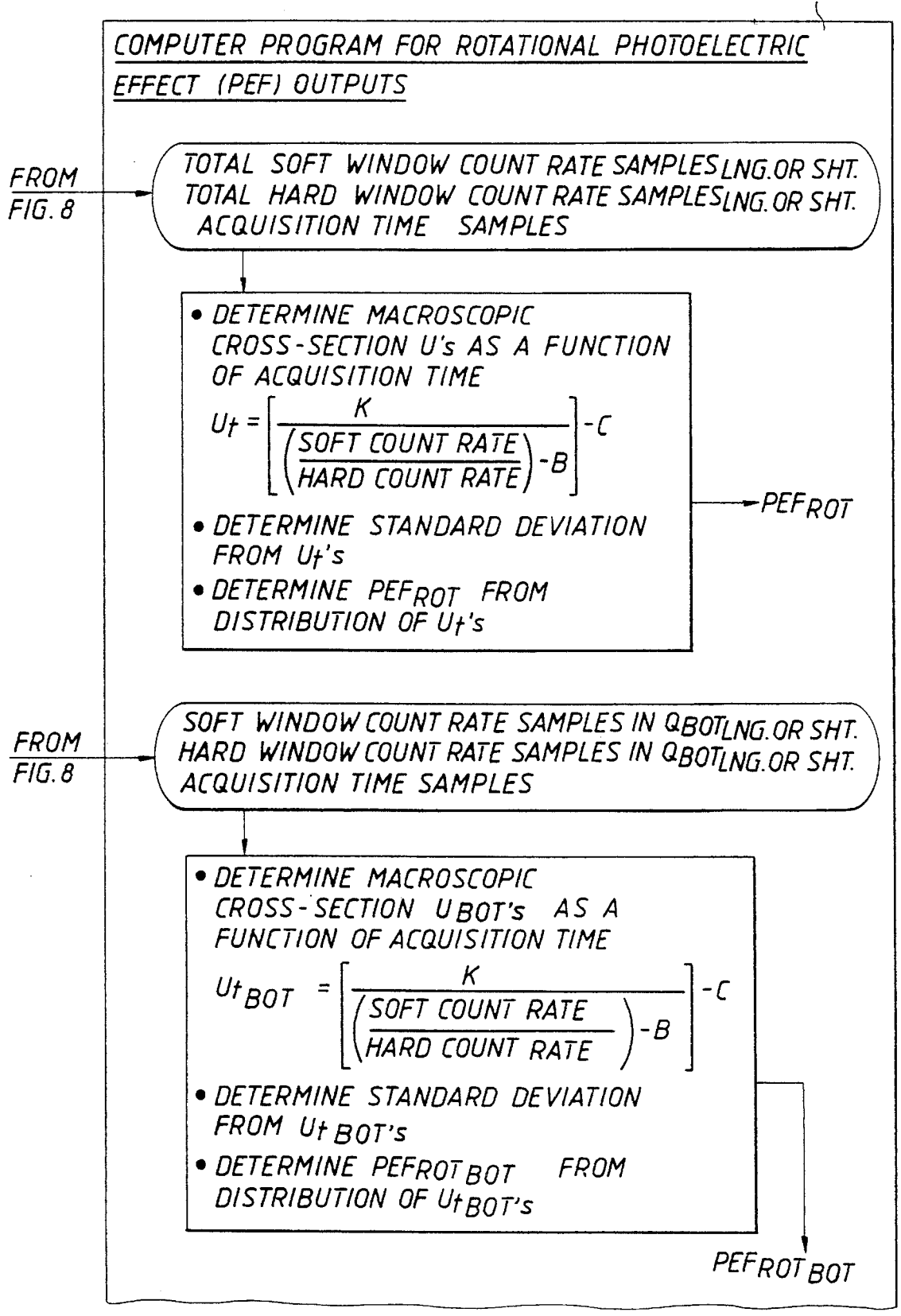
Figure 12E:
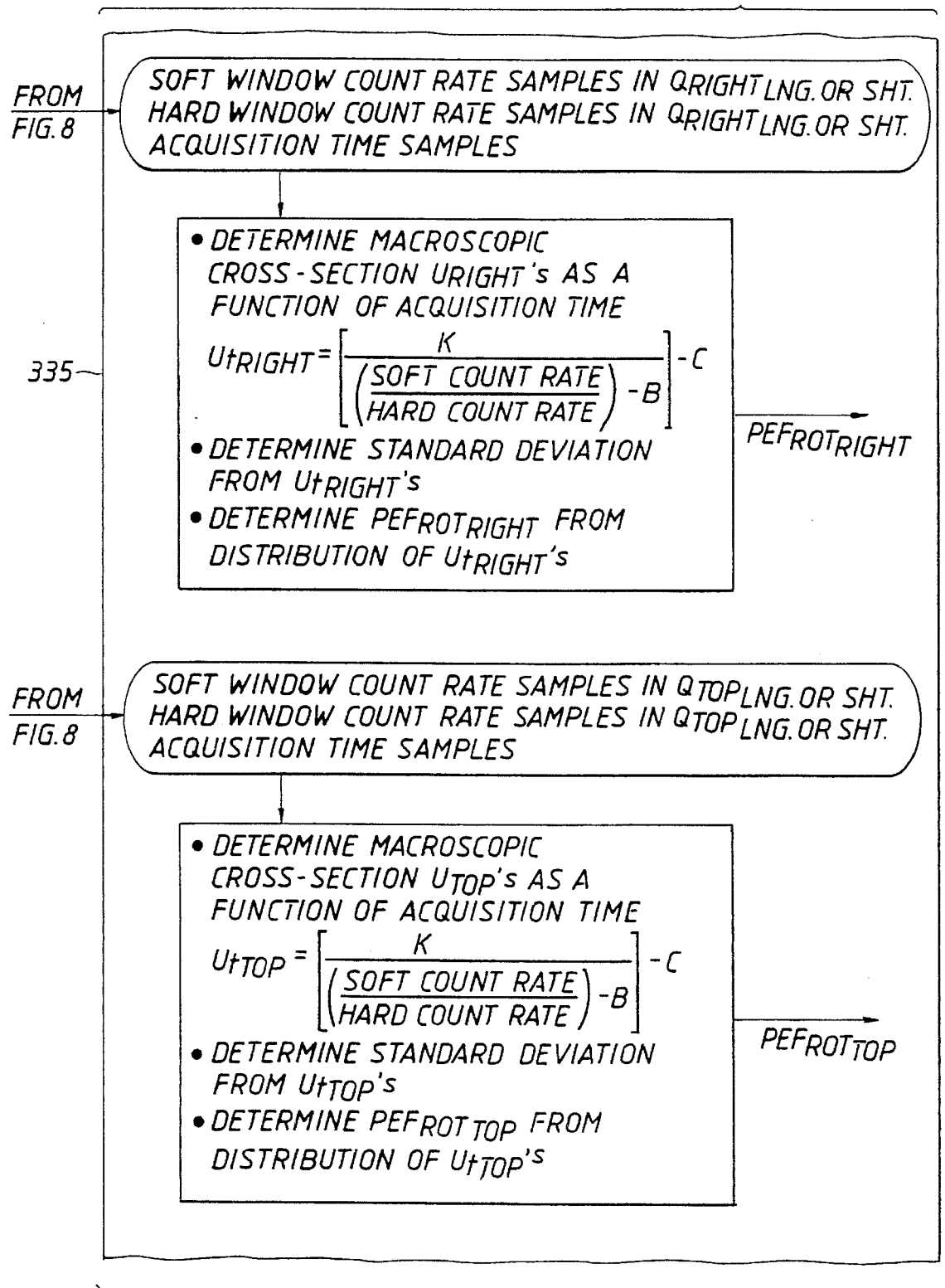

An alternative methodology for determining rotational PEF is illustrated in FIGS. 12D–F. The total soft count rate and total hard count rate from the long spaced or, alternatively, the short spaced gamma ray detector are accumulated for a plurality of acquisition time samples. Next, for each such acquisition time sample, a macroscopic cross section factor $U_t$ is determined as a function of acquisition time t:

$$U_t = \left[ \frac{K}{\left( \frac{\text{SOFT COUNT RATE}}{\text{HARD COUNT RATE}} \right) - B} \right] - C$$

where K, B and C are experimentally determined constants.

Next, the standard deviation is determined from the distribution of $U_t$ factors. Finally, a rotational value of photoelectric effect, $PEF_{ROT}$, is determined from the distribution of $U_t$'s. Such rotational value is determined in a manner similar to that illustrated in FIGS. 10Aa, 10Ab and 10D for the determination of $\rho_{b\ ROT}$ from a distribution of count rate samples as a function of count rate. The methodology then proceeds as previously described to a determination of the overall $PEF_{ROT}$ and $PEF_{ROT}$ for each quadrant.

Ultrasonic Standoff Determination

As illustrated in FIG. 13, computer program 350 of downhole computer 301 determines borehole shape from standoff determinations based on ultrasonic signals. As mentioned above, U.S. Pat. No. 5,130,950, incorporated herein by reference, describes the determination of standoff. Such standoff, i.e. the distance between the ultrasonic sensor and the borehole wall, is determined as a function of quadrant and collected for each quadrant.

A distribution of standoff values are collected per quadrant for a predetermined acquisition time. From such distribution, for each quadrant, an average, maximum and minimum value of standoff is determined. From such values, a "vertical" diameter of the borehole, using the average standoff of the bottom quadrant plus the tool diameter plus the average standoff of the top quadrant is determined. The "horizontal" diameter is determined in a similar manner.

Determination of Maximum or Minimum Rotational Density

As described above, rotational density is determined around the entire borehole and for each of the quadrants to compensate for borehole effects as an alternative technique to the spine and ribs technique. The invention further provides a determination of whether apparent mud density in the borehole, that is the measured density including photoelectric effect, is greater than or less than apparent formation density by incorporating information from the ultrasonic measurement of standoff per quadrant as described above with respect to FIG. 13. If the average gamma ray counts in a quadrant with standoff (e.g., top quadrant) are higher than the average gamma ray counts in a quadrant with no standoff (e.g., bottom quadrant), then apparent formation density is determined to be higher than apparent mud density. Therefore, a maximum rotational density is determined.

If the average gamma ray counts in a quadrant with standoff (e.g. top quadrant) are lower than the average gamma ray counts in a quadrant with no standoff (e.g. bottom quadrant), then apparent formation density is determined to be lower than apparent mud density. Therefore, a minimum rotational density is determined.

Determination of Average Neutron Porosity

Figure 14B:
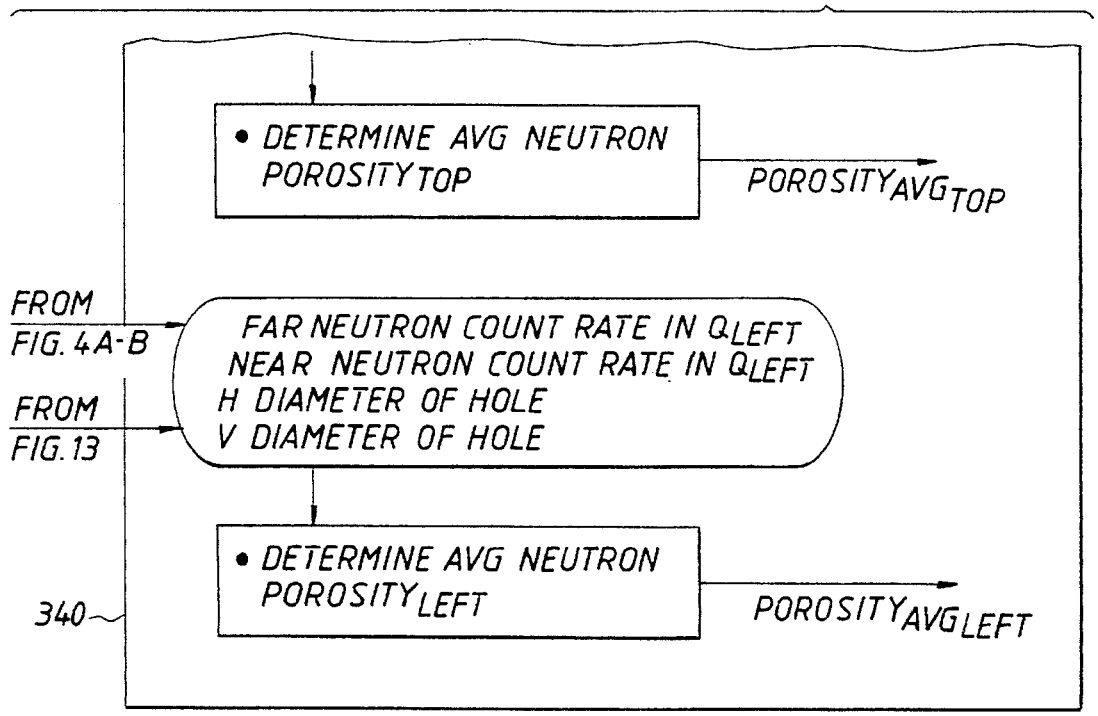

FIGS. 14A and 14B illustrate a computer program 340 of downhole computer 301 which accepts near and far detector neutron count rates from LWD tool 100. It also accepts horizontal and vertical hole diameter digital signals from computer program 350 (FIG. 13 discussed above.) Neutron count rate is affected by hole diameter. Correction curves for hole size for neutron count rates are published in the technical literature. Accordingly, measured near and far neutron count rates are corrected, in this aspect of the invention; by using correction curves or tables for hole size as determined by the ultrasonic sensor and associated computer program 350 as described above. Average porosity determination from program 341 using all borehole counts and compensated for offset of the tool from the borehole as a function of quadrants is made in a conventional manner.

In a similar way a porosity digital signal is determined for each of the individual quadrants from far and near neutron detector count rates per quadrant and from such hole shape data.

Determination of Rotational Neutron Porosity

Figure 15A:
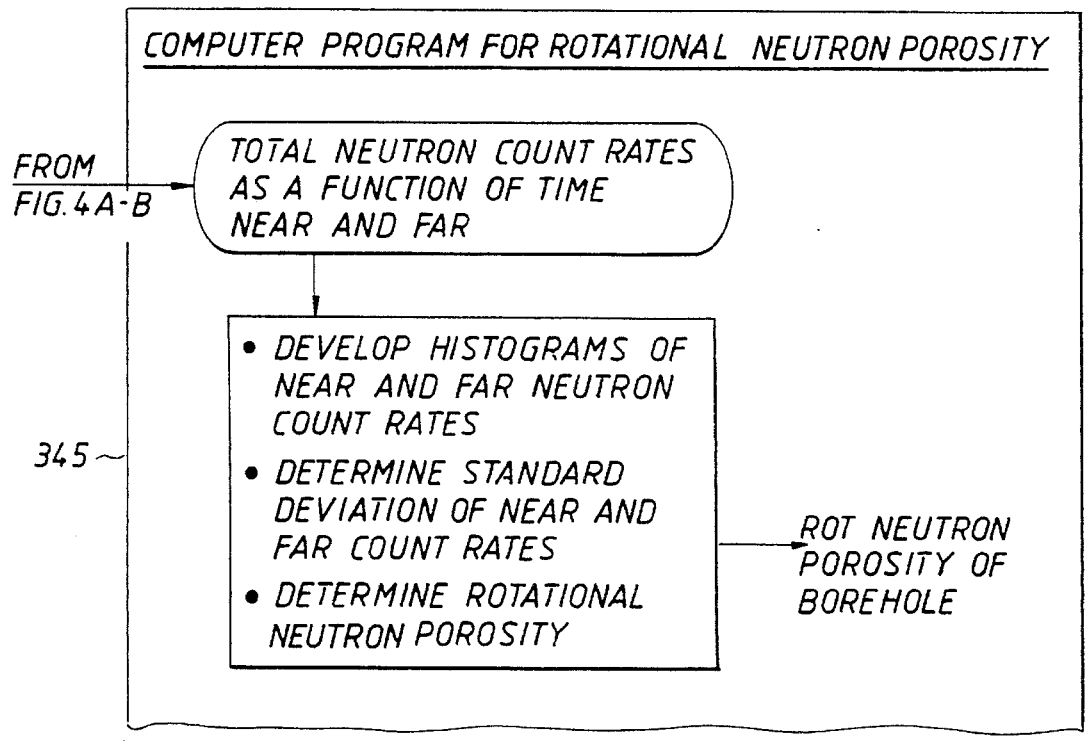
FIGS. 15A–C illustrate a computer program in the LWD computer for determination of rotational neutron porosity for the entire borehole and for each quadrant.
Figure 15B:
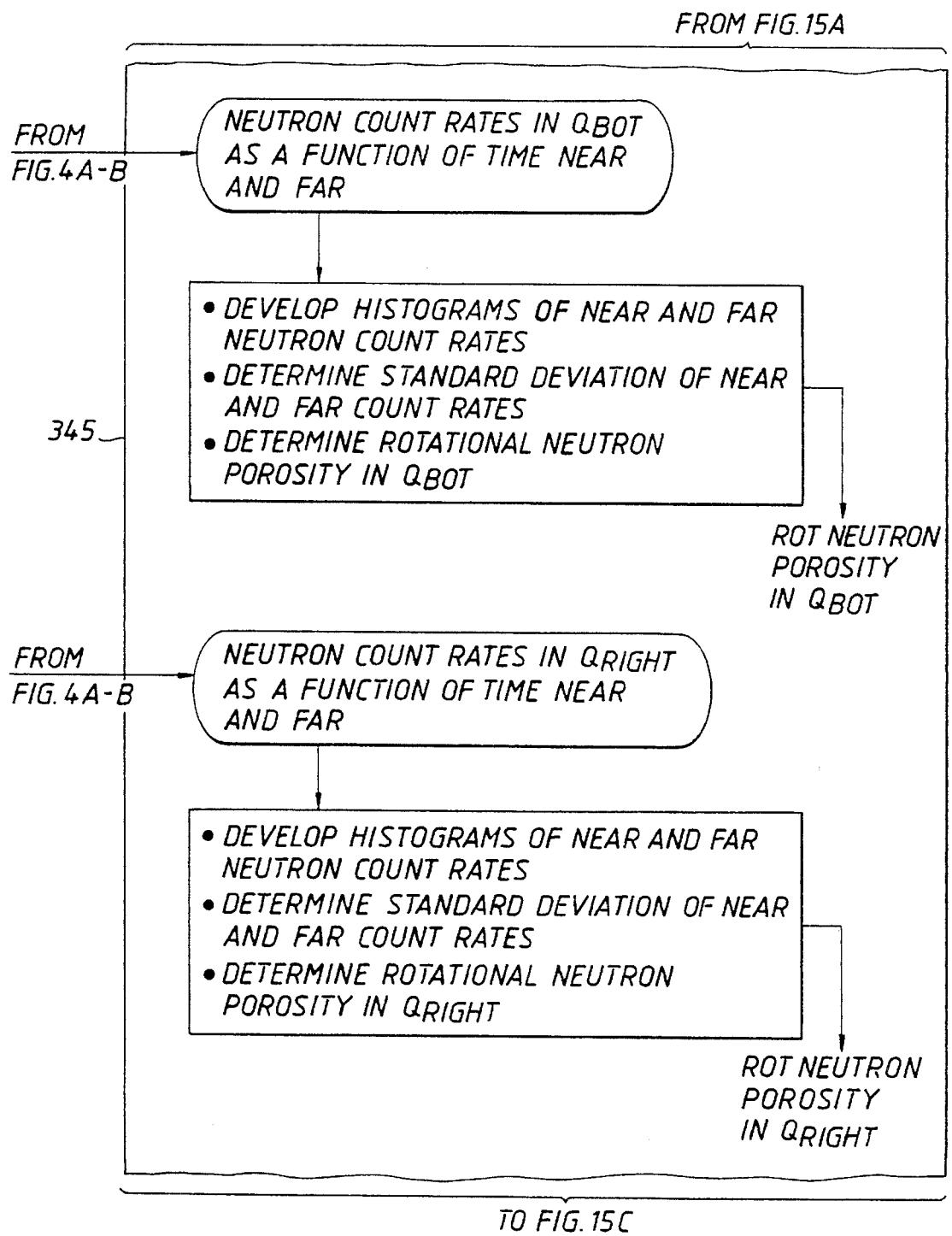
Figure 15C:
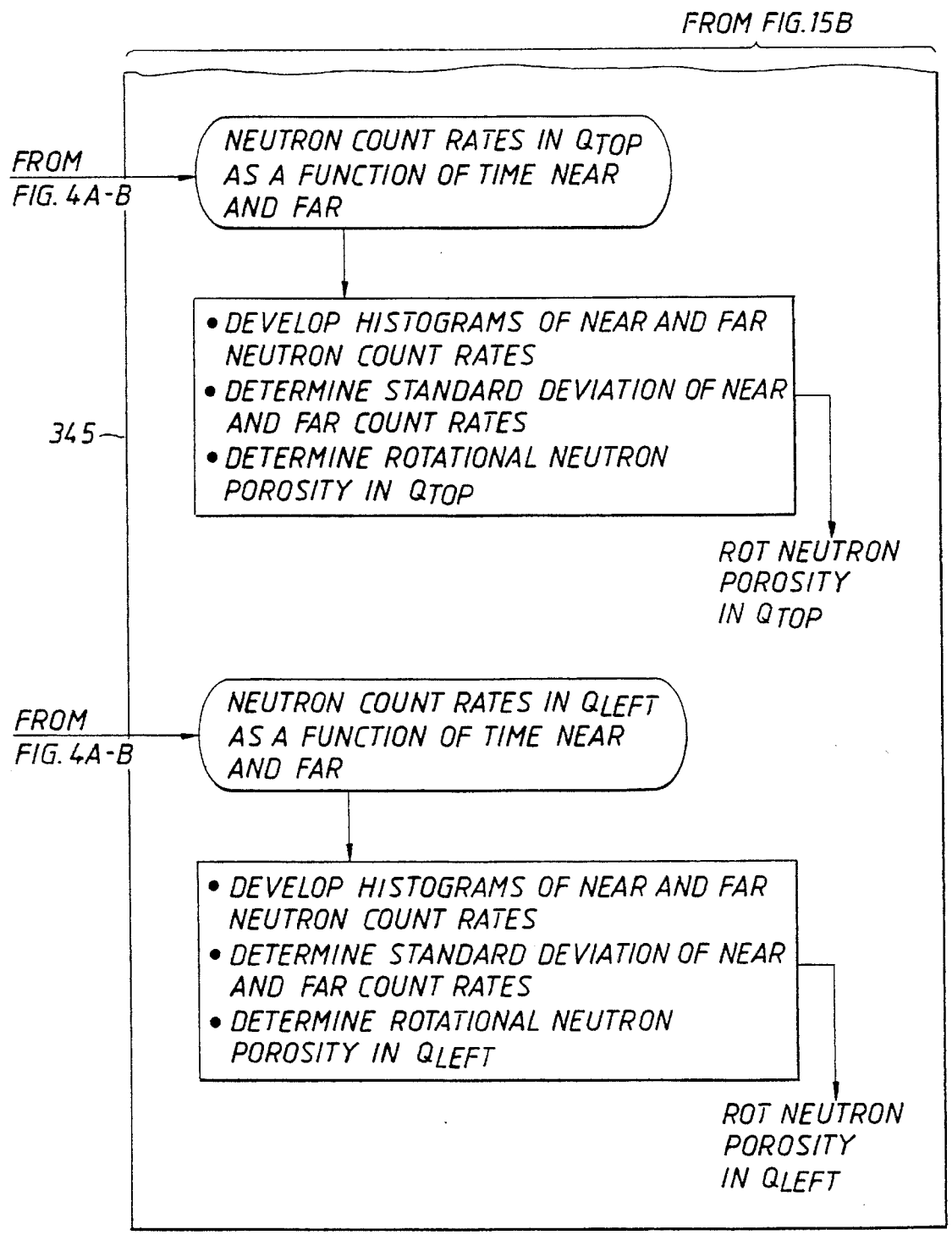

FIGS. 15A–C illustrate computer program 345 of downhole computer 301 which accepts total near and far neutron count rates. Histograms, that is distributions, are produced from all such count rates during the acquisition time. The standard deviation of each distribution is determined. Such standard deviations are used to determine rotational neutron porosity for the entire borehole and for each quadrant in a manner similar to that described in FIG. 10D for the determination of rotational bulk density.

Determination of Formation Heterogeneity

FIG. 4B illustrates a borehole which is surrounded not by a homogeneous formation, but by two different rock formations. The methods of this invention are ideally suited for accessing the degree of formation heterogeneity which exists about the borehole.

Using density measurements, or porosity measurements as disclosed herein, such signals as associated in each particular one of the plurality of angular distance segments defined by the apparatus of FIG. 1 and FIGS. 3A and 3B, and according to computer program 310, a signal characteristic of the formations surrounding the borehole, such as density, PEF or porosity, is derived for each of the angular distance segments. Formation heterogeneity is assessed by comparing one signal characteristic of the formation from one angular distance segment to another. Such comparison may take the form of a simple differencing of such characteristic from one segment to another, or it may take the form of determining a statistical parameter such as standard deviation or variance of a characteristic, such as porosity or density, and comparing (e.g. by differencing) such statistical parameter of one segment with another.

Information Storage

All of the output digital signals may be stored in mass memory devices (not illustrated) of computer 301 for review and possible further analysis and interpretation when the bottom hole drilling assembly is returned to the surface. Certain data, limited in amount due to band width limitations, may be transmitted to surface instrumentation via the drill string mud path from communications sub 400.

Various modifications and alterations in the described methods and apparatus which do not depart from the spirit of the invention will be apparent to those skilled in the art of the foregoing description. For this reason, such changes are desired to be included in the appended claims. The appended claims recite the only limitation to the present invention. The descriptive manner which is employed for setting forth the embodiments should be interpreted as illustrative but not limitative.

What is claimed is:

1. A method for determining standoff between a logging while drilling tool and an inclined borehole in which said tool is received, including the steps of, determining a bottom contact point of said tool which contacts said inclined borehole while said tool is rotating in said borehole;

defining a bottom angular distance segment, called SEGMENT$_{BOTTOM}$ of said borehole which includes said bottom contact point;

using an ultrasonic transducer in said tool for measuring standoff between said tool and said borehole as a function of angular position of said transducer with respect to said borehole;

for a predetermined period of time, recording each measurement value of standoff which occurs in said bottom angular distance segment to produce a bottom angular distance standoff histogram; and determining a signal proportional to average standoff of said bottom angular distance segment called BOTTOM STANDOFF$_{AVG}$, from said bottom angular distance standoff histogram.

2. The method of claim 1 further comprising the step of for said predetermined period of time, recording each measurement value of standoff which occurs in at least one additional angular distance segment of said borehole to produce another angular distance standoff histogram; and determining a signal proportional to average standoff, called ANOTHER STANDOFF$_{AVG}$, from said another angular distance standoff histogram.

3. The method of claim 1 wherein said bottom angular distance segment comprises a segment of said borehole which is approximately bisected by said bottom contact point of said tool; and three additional angular distance segments called SEGMENT$_{RIGHT}$, SEGMENT$_{TOP}$, and SEGMENT$_{LEFT}$ are defined about said borehole in addition to said bottom angular distance segment, said method further comprising the steps of recording for said predetermined period of time, each measurement value of standoff which occurs in each additional angular distance segment to produce a histogram of standoff measurements for each of said additional angular distance segments; and determining signals proportional to average standoff of respective signals called RIGHT STANDOFF$_{AVG}$, TOP STANDOFF$_{AVG}$, and LEFT STANDOFF$_{AVG}$ from said respective additional angular distance segment histograms.

4. The method of claim 3 wherein shape signals are generated according to the steps of determining a measured vertical diameter of said borehole as a function of said BOTTOM STANDOFF$_{AVG}$ and said TOP STANDOFF$_{AVG}$ signals; and determining a measured horizontal diameter of said borehole as a function of said RIGHT STANDOFF$_{AVG}$ and said LEFT STANDOFF$_{AVG}$ signals.

5. The method of claim 1 wherein said bottom contact point of said tool which contacts said inclined borehole while said tool is rotating in said borehole is determined according to the steps of in a sub having x, y, z axes corresponding to respective axes of said logging while drilling tool determining an $\vec{H}_1^1$ vector of $H_x$, $H_y$ signals from magnetometers oriented along x and y axes orthogonal to a z axis along the longitudinal axis of said borehole determining a $\vec{G}^1$ vector of $G_x$, $G_y$ signals from accelerometers oriented along respective x and y axes of said sub, and determining an angle $\phi$ between said $\vec{H}_1^1$ vector and said $\vec{G}^1$ vector, and in said logging while drilling tool determining an $\vec{H}_2^1$ vector of $H_x$, $H_y$ signals from magnetometers oriented along respective x and y axes of said tool, transferring said $\phi$ signal from said sub to said logging while drilling tool, as said logging while drilling tool rotates in said borehole, determining a signal representative of an angle $\theta(t)$ between an axis of said cross section of said tool and said $\vec{H}_2^1$ vector measured with said magnetometers of said tool, and determining a signal representative of a down vector $\vec{D}(t)$ which constantly points to said bottom contact point by subtracting said $\phi$ signal from said $\theta(t)$ signal.

6. Apparatus for determining standoff comprising a logging while drilling tool designed for operation in an inclined borehole, means for determining a bottom contact point of said tool which contacts said inclined borehole while said tool is rotating in said borehole;

means for determining the extent of a bottom angular distance segment, called SEGMENT$_{BOTTOM}$ of said borehole which includes said bottom contact point;

ultrasonic transducer means disposed in said tool for measuring standoff between said tool and said borehole as a function of angular position of said transducer with respect to said borehole;

means for recording, for a predetermined period of time, each measurement value of standoff which occurs in said bottom angular distance segment to produce a bottom angular distance standoff histogram; and computer program means for determining a signal proportional to average standoff of said bottom angular distance segment called BOTTOM STANDOFF$_{AVG}$, from said bottom angular distance standoff histogram.

7. The apparatus of claim 6 further comprising means for recording, for said predetermined period of time, each measurement value of standoff which occurs in at least one additional angular distance segment of said borehole to produce another angular distance standoff histogram; and computer program means for determining a signal proportional to average standoff, called ANOTHER STANDOFF$_{AVG}$, from said another angular distance standoff histogram.

8. The apparatus of claim 6 wherein said bottom angular distance segment comprises a segment of said borehole which is approximately bisected by said bottom contact point of said tool; and three additional angular distance segments called SEGMENT$_{RIGHT}$, SEGMENT$_{TOP}$, and SEGMENT$_{LEFT}$ are defined about said borehole in addition to said bottom angular distance segment, said apparatus further comprising means for recording, for said predetermined period of time, each measurement value of standoff which occurs in each additional angular distance segment to produce a histogram of standoff measurements for each of said additional angular distance segments; and computer program means for determining signals proportional to average standoff of respective signals called RIGHT STANDOFF$_{AVG}$, TOP STANDOFF$_{AVG}$, and LEFT STANDOFF$_{AVG}$ from said respective additional angular distance segment histograms.

9. The apparatus of claim 8 further comprising computer program means for determining a measured vertical diameter of said borehole as a function of said BOTTOM STANDOFF$_{AVG}$ and said TOP STANDOFF$_{AVG}$ signals; and computer program means for determining a measured horizontal diameter of said borehole as a function of said RIGHT STANDOFF$_{AVG}$ and said LEFT STANDOFF$_{AVG}$ signals.

\* \* \* \* \*